US008840018B2

(12) United States Patent
Gelman et al.

(10) Patent No.: US 8,840,018 B2
(45) Date of Patent: Sep. 23, 2014

(54) DEVICE WITH TIME VARYING SIGNAL

(75) Inventors: Geoffrey M. Gelman, New York, NY (US); Ronald Rushin, Las Vegas, NV (US); Dean P. Alderucci, New York, NY (US); Joseph M. Asher, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 13/615,440

(22) Filed: Sep. 13, 2012

(65) Prior Publication Data

US 2013/0065672 A1    Mar. 14, 2013

Related U.S. Application Data

(63) Continuation of application No. 12/792,361, filed on Jun. 2, 2010, and a continuation of application No. 11/686,354, filed on Mar. 15, 2007, which is a continuation-in-part of application No. 11/418,939, filed on May 5, 2006, now Pat. No. 7,549,576.

(51) Int. Cl.
*G06K 5/00* (2006.01)

(52) U.S. Cl.
USPC .......................................... 235/380; 235/492

(58) Field of Classification Search
USPC .......... 235/493, 492, 454, 382, 381, 375, 380
See application file for complete search history.

(56) References Cited

U.S. PATENT DOCUMENTS

| | | |
|---|---|---|
| 3,580,581 A | 5/1971 | Raven |
| 3,838,259 A | 9/1974 | Kortenhaus |
| 3,876,208 A | 4/1975 | Wachtler et al. |
| 3,929,338 A | 12/1975 | Busch |
| 4,101,129 A | 7/1978 | Cox |
| 4,157,829 A | 6/1979 | Goldman et al. |
| 4,206,920 A | 6/1980 | Weatherford et al. |
| 4,216,965 A | 8/1980 | Morrison et al. |

(Continued)

FOREIGN PATENT DOCUMENTS

| | | |
|---|---|---|
| CN | 1346549 | 4/2002 |
| DE | 31 29 550 A1 | 4/1982 |

(Continued)

OTHER PUBLICATIONS

Solutions for Restaurants, Hotels & Resorts and Clubs—Guest bridge, Inc. (online). Guestbridge, Inc. Feb. 6, 2007 [retrieved on Aug. 21, 2008]. Retrieved from the Internet: <URL: http://web.archive.org/web/20070206134139/www.guestbridge.com/solutions.html, entire document especially p. 1.

(Continued)

*Primary Examiner* — Thien M Le
(74) *Attorney, Agent, or Firm* — Glen R. Farbanish

(57) ABSTRACT

Systems and methods for controlling access to wireless gaming devices and networks are provided. For example, access is controlled through one or more levels of security checks, such as a hard security check instead of or in addition to a soft security check. In a hard security check, the user employs an apparatus such as a card or other physical token that can be used to access the wireless gaming device. Such an apparatus may communicate information that identifies the user to the device or may simply be used to produce a signal without which the device is locked to users. The apparatus may further emit a time varying signal to enhance security.

12 Claims, 5 Drawing Sheets

(56) References Cited

U.S. PATENT DOCUMENTS

| | | |
|---|---|---|
| 4,238,127 A | 12/1980 | Lucero et al. |
| 4,240,635 A | 12/1980 | Brown |
| 4,266,214 A | 5/1981 | Peters, Jr. |
| 4,335,809 A | 6/1982 | Wain |
| 4,448,419 A | 5/1984 | Telnaes |
| 4,467,424 A | 8/1984 | Hedges et al. |
| 4,492,379 A | 1/1985 | Okada |
| 4,527,798 A | 7/1985 | Siekierski et al. |
| 4,572,509 A | 2/1986 | Stirick |
| 4,573,681 A | 3/1986 | Okada |
| 4,614,342 A | 9/1986 | Takashima |
| 4,624,459 A | 11/1986 | Kaufman |
| 4,636,951 A | 1/1987 | Harlick |
| 4,648,600 A | 3/1987 | Oliiges |
| 4,652,998 A | 3/1987 | Koza et al. |
| 4,692,863 A | 9/1987 | Moosz |
| 4,760,527 A | 7/1988 | Sidley |
| 4,805,907 A | 2/1989 | Hagiwara |
| 4,810,868 A | 3/1989 | Drexler |
| 4,817,951 A | 4/1989 | Crouch et al. |
| 4,838,552 A | 6/1989 | Hagiwara |
| 4,853,884 A | 8/1989 | Brown et al. |
| 4,856,787 A | 8/1989 | Itkis |
| 4,858,932 A | 8/1989 | Keane |
| 4,880,237 A | 11/1989 | Kishishita |
| 4,909,516 A | 3/1990 | Kolinsky |
| 4,926,327 A | 5/1990 | Sidley |
| 4,959,783 A | 9/1990 | Scott et al. |
| 4,964,638 A | 10/1990 | Ishida |
| 5,007,087 A | 4/1991 | Bernstein et al. |
| 5,024,441 A | 6/1991 | Rosseau |
| 5,048,833 A | 9/1991 | Lamle |
| 5,050,881 A | 9/1991 | Nagao |
| 5,055,662 A | 10/1991 | Hasegawa |
| 5,056,141 A | 10/1991 | Dyke |
| 5,074,559 A | 12/1991 | Okada |
| 5,083,785 A | 1/1992 | Okada |
| 5,096,195 A | 3/1992 | Gimmon |
| 5,096,202 A | 3/1992 | Hesland |
| 5,102,134 A | 4/1992 | Smyth |
| 5,192,076 A | 3/1993 | Komori |
| 5,229,764 A | 7/1993 | Matchett et al. |
| 5,242,163 A | 9/1993 | Fulton |
| 5,251,165 A | 10/1993 | James, III |
| 5,251,898 A | 10/1993 | Dickenson et al. |
| 5,263,716 A | 11/1993 | Smyth |
| 5,265,874 A | 11/1993 | Dickinson et al. |
| 5,280,426 A | 1/1994 | Edmonds |
| 5,280,909 A | 1/1994 | Tracy |
| 5,298,476 A | 3/1994 | Hotta et al. |
| 5,324,035 A | 6/1994 | Morris et al. |
| 5,326,104 A | 7/1994 | Pease et al. |
| 5,344,199 A | 9/1994 | Carstens et al. |
| 5,351,970 A | 10/1994 | Fioretti |
| 5,359,183 A | 10/1994 | Skodlar |
| 5,370,306 A | 12/1994 | Schulze et al. |
| 5,380,007 A | 1/1995 | Travis et al. |
| 5,380,008 A | 1/1995 | Mathis et al. |
| 5,393,061 A | 2/1995 | Manship et al. |
| 5,398,932 A | 3/1995 | Eberhardt et al. |
| 5,415,416 A | 5/1995 | Scagnelli et al. |
| 5,421,576 A | 6/1995 | Yamazaki et al. |
| 5,429,361 A | 7/1995 | Raven et al. |
| 5,471,044 A | 11/1995 | Hotta et al. |
| 5,476,259 A | 12/1995 | Weingardt |
| 5,505,449 A | 4/1996 | Eberhardt et al. |
| 5,507,485 A | 4/1996 | Fisher |
| 5,511,784 A | 4/1996 | Furry et al. |
| 5,524,888 A | 6/1996 | Heidel |
| 5,534,685 A | 7/1996 | Takemoto et al. |
| 5,551,692 A | 9/1996 | Pettit et al. |
| 5,569,083 A | 10/1996 | Fioretti |
| 5,569,084 A | 10/1996 | Nicastro et al. |
| 5,580,309 A | 12/1996 | Piechowiak et al. |
| 5,586,937 A | 12/1996 | Menashe |
| 5,588,913 A | 12/1996 | Hecht |
| 5,613,912 A | 3/1997 | Slater |
| 5,618,232 A | 4/1997 | Martin |
| 5,653,634 A | 8/1997 | Hodges |
| 5,654,746 A | 8/1997 | McMulan, Jr. et al. |
| 5,655,961 A | 8/1997 | Acres et al. |
| 5,675,828 A | 10/1997 | Stoel et al. |
| 5,697,844 A | 12/1997 | Von Kohorn |
| 5,702,302 A | 12/1997 | Gauselman |
| 5,707,286 A | 1/1998 | Carlson |
| 5,738,583 A | 4/1998 | Comas et al. |
| 5,745,102 A | 4/1998 | Bloch et al. |
| 5,762,552 A | 6/1998 | Vuong et al. |
| 5,764,789 A | 6/1998 | Pare, Jr. et al. |
| 5,766,076 A | 6/1998 | Pease et al. |
| 5,768,382 A | 6/1998 | Schneier et al. |
| 5,772,508 A | 6/1998 | Sugita et al. |
| 5,785,595 A | 7/1998 | Gauselman |
| 5,816,920 A | 10/1998 | Hanai |
| 5,833,536 A | 11/1998 | Davids et al. |
| 5,835,722 A | 11/1998 | Bradshaw et al. |
| 5,836,817 A | 11/1998 | Acres et al. |
| 5,851,148 A | 12/1998 | Brune et al. |
| 5,857,911 A | 1/1999 | Fioretti |
| 5,871,398 A | 2/1999 | Schneier et al. |
| 5,878,211 A | 3/1999 | Delagrange |
| 5,889,474 A | 3/1999 | LaDue |
| 5,902,983 A | 5/1999 | Crevelt et al. |
| 5,904,619 A | 5/1999 | Scagnelli et al. |
| 5,904,620 A | 5/1999 | Kujawa |
| 5,907,282 A | 5/1999 | Tuorto et al. |
| 5,910,047 A | 6/1999 | Scagnelli et al. |
| 5,920,640 A | 7/1999 | Salatino et al. |
| 5,921,865 A | 7/1999 | Scagnelli |
| 5,931,764 A | 8/1999 | Freeman et al. |
| 5,935,005 A | 8/1999 | Tsuda et al. |
| 5,951,397 A | 9/1999 | Dickinson |
| 5,954,583 A | 9/1999 | Green |
| 5,955,961 A | 9/1999 | Wallerstein |
| 5,959,596 A | 9/1999 | McCarten et al. |
| 5,970,143 A | 10/1999 | Schneier et al. |
| 5,977,957 A | 11/1999 | Miller et al. |
| 5,987,611 A | 11/1999 | Freund |
| 5,991,431 A | 11/1999 | Borza et al. |
| 5,995,630 A | 11/1999 | Borza et al. |
| 5,999,808 A | 12/1999 | LaDue |
| 6,001,016 A | 12/1999 | Walker et al. |
| 6,003,013 A | 12/1999 | Boushy et al. |
| 6,011,973 A | 1/2000 | Valentine et al. |
| 6,012,636 A | 1/2000 | Smith |
| 6,012,982 A | 1/2000 | Piechowiak et al. |
| 6,019,284 A | 2/2000 | Freeman et al. |
| 6,022,274 A | 2/2000 | Takeda et al. |
| 6,027,115 A | 2/2000 | Griswold et al. |
| 6,048,269 A | 4/2000 | Burns et al. |
| 6,050,622 A | 4/2000 | Gustafson |
| 6,065,056 A | 5/2000 | Bradshaw et al. |
| 6,080,061 A | 6/2000 | Watanabe et al. |
| 6,098,985 A | 8/2000 | Moody |
| 6,099,408 A | 8/2000 | Schneier et al. |
| 6,100,804 A | 8/2000 | Brady et al. |
| 6,104,815 A | 8/2000 | Alcorn |
| 6,117,011 A | 9/2000 | Lvov |
| 6,135,884 A | 10/2000 | Hedrick et al. |
| 6,139,431 A | 10/2000 | Walker et al. |
| 6,146,270 A | 11/2000 | Huard et al. |
| 6,148,094 A | 11/2000 | Kinsella |
| 6,177,905 B1 | 1/2001 | Welch |
| 6,178,255 B1 | 1/2001 | Scott et al. |
| 6,178,510 B1 | 1/2001 | O'Connoe et al. |
| 6,183,366 B1 | 2/2001 | Goldberg et al. |
| 6,193,153 B1 | 2/2001 | Lambert |
| 6,196,920 B1 | 3/2001 | Spaur et al. |
| 6,210,274 B1 | 4/2001 | Carlson |
| 6,212,392 B1 | 4/2001 | Fitch et al. |
| 6,219,439 B1 | 4/2001 | Burger |
| 6,233,448 B1 | 5/2001 | Alperovich et al. |
| 6,248,017 B1 | 6/2001 | Roach |
| 6,251,014 B1 | 6/2001 | Stockdale et al. |

(56) References Cited

U.S. PATENT DOCUMENTS

| | | |
|---|---|---|
| 6,251,017 B1 | 6/2001 | Leason et al. |
| 6,264,560 B1 | 7/2001 | Goldberg et al. |
| 6,265,973 B1 | 7/2001 | Brammall et al. |
| 6,272,223 B1 | 8/2001 | Carlson |
| 6,277,026 B1 | 8/2001 | Archer |
| 6,277,029 B1 | 8/2001 | Hanley |
| 6,280,325 B1 | 8/2001 | Fisk |
| 6,287,202 B1 | 9/2001 | Pascal et al. |
| 6,290,601 B1 | 9/2001 | Yamazaki et al. |
| RE37,414 E | 10/2001 | Harlick |
| 6,309,307 B1 | 10/2001 | Krause et al. |
| 6,320,495 B1 | 11/2001 | Sporgis |
| 6,325,285 B1 | 12/2001 | Baratelli |
| 6,325,292 B1 | 12/2001 | Sehr |
| 6,331,148 B1 | 12/2001 | Krause et al. |
| 6,386,976 B1 | 5/2002 | Yamazaki et al. |
| 6,409,602 B1 | 6/2002 | Wiltshire et al. |
| 6,424,029 B1 | 7/2002 | Giesler |
| 6,425,828 B2 | 7/2002 | Walker et al. |
| 6,428,413 B1 | 8/2002 | Carlson |
| 6,441,752 B1 | 8/2002 | Fomukong |
| RE37,885 E | 10/2002 | Acres et al. |
| 6,468,155 B1 | 10/2002 | Zucker |
| 6,507,279 B2 | 1/2003 | Loof |
| 6,508,709 B1 | 1/2003 | Karmarkar |
| 6,508,710 B1 | 1/2003 | Paravia et al. |
| 6,509,217 B1 | 1/2003 | Reddy |
| 6,520,853 B2 | 2/2003 | Suzuki |
| 6,524,189 B1 | 2/2003 | Rautila |
| 6,527,641 B1 | 3/2003 | Sinclair et al. |
| 6,542,750 B2 | 4/2003 | Hendrey et al. |
| 6,554,705 B1 | 4/2003 | Cumbers |
| 6,554,707 B1 | 4/2003 | Sinclair |
| 6,556,819 B2 | 4/2003 | Irvin |
| 6,575,834 B1 | 6/2003 | Lindo |
| 6,577,733 B1 | 6/2003 | Charrin |
| 6,582,302 B2 | 6/2003 | Romero |
| 6,585,597 B2 | 7/2003 | Finn |
| 6,612,928 B1 | 9/2003 | Bradford et al. |
| 6,614,350 B1 | 9/2003 | Lunsford et al. |
| 6,618,706 B1 | 9/2003 | Rive et al. |
| 6,622,157 B1 | 9/2003 | Heddaya et al. |
| 6,628,939 B2 | 9/2003 | Paulsen |
| 6,631,849 B2 | 10/2003 | Blossom |
| 6,634,942 B2 | 10/2003 | Walker |
| 6,652,378 B2 | 11/2003 | Cannon et al. |
| 6,676,522 B2 | 1/2004 | Rowe et al. |
| 6,680,675 B1 | 1/2004 | Suzuki |
| 6,682,421 B1 | 1/2004 | Rowe et al. |
| 6,691,032 B1 | 2/2004 | Irish et al. |
| 6,709,333 B1 | 3/2004 | Bradford et al. |
| 6,719,631 B1 | 4/2004 | Tulley et al. |
| 6,721,542 B1 | 4/2004 | Anttila et al. |
| 6,729,956 B2 | 5/2004 | Wolf et al. |
| 6,743,098 B2 | 6/2004 | Urie et al. |
| 6,745,011 B1 | 6/2004 | Hendrickson |
| 6,749,505 B1 | 6/2004 | Kunzle |
| 6,754,210 B1 | 6/2004 | Ofek |
| 6,755,742 B1 | 6/2004 | Hartman |
| 6,756,882 B2 | 6/2004 | Benes |
| 6,761,638 B1 | 7/2004 | Narita |
| 6,773,350 B2 | 8/2004 | Yoshimi et al. |
| 6,778,820 B2 | 8/2004 | Tendler |
| 6,793,580 B2 | 9/2004 | Sinclair |
| 6,800,029 B2 | 10/2004 | Rowe et al. |
| 6,800,031 B2 | 10/2004 | Di Cesare |
| 6,801,934 B1 | 10/2004 | Eranko |
| 6,802,772 B1 | 10/2004 | Kunzle |
| 6,812,824 B1 | 11/2004 | Goldinger et al. |
| 6,834,195 B2 | 12/2004 | Brandenberg et al. |
| 6,837,789 B2 | 1/2005 | Garahi et al. |
| 6,843,412 B1 | 1/2005 | Sanford |
| 6,843,725 B2 | 1/2005 | Nelson |
| 6,846,238 B2 | 1/2005 | Wells et al. |
| 6,857,959 B1 | 2/2005 | Nguyen |
| 6,863,610 B2 | 3/2005 | Vancraeynest |
| 6,868,396 B2 | 3/2005 | Smith et al. |
| 6,884,162 B2 | 4/2005 | Raverdy |
| 6,884,166 B2 | 4/2005 | Leen et al. |
| 6,887,151 B2 | 5/2005 | Leen et al. |
| 6,887,159 B2 | 5/2005 | Leen et al. |
| 6,892,218 B2 | 5/2005 | Heddaya et al. |
| 6,892,938 B2 | 5/2005 | Solomon |
| 6,893,347 B1 | 5/2005 | Zilliacus |
| 6,896,618 B2 | 5/2005 | Benoy et al. |
| 6,898,299 B1 | 5/2005 | Brooks |
| 6,899,628 B2 | 5/2005 | Leen et al. |
| 6,904,520 B1 | 6/2005 | Rosset |
| 6,908,387 B2 | 6/2005 | Hedrick et al. |
| 6,908,391 B2 | 6/2005 | Gatto et al. |
| 6,923,724 B2 | 8/2005 | Williams |
| 6,935,952 B2 | 8/2005 | Walker et al. |
| 6,935,958 B2 | 8/2005 | Nelson |
| 6,942,574 B1 | 9/2005 | LeMay et al. |
| 6,945,870 B2 | 9/2005 | Gatto et al. |
| RE38,812 E | 10/2005 | Acres et al. |
| 6,966,832 B2 | 11/2005 | Leen et al. |
| 6,979,264 B2 | 12/2005 | Chatigny et al. |
| 6,979,267 B2 | 12/2005 | Leen et al. |
| 6,984,175 B2 | 1/2006 | Nguyen et al. |
| 6,986,055 B2 | 1/2006 | Carlson |
| 6,997,810 B2 | 2/2006 | Cole |
| 7,021,623 B2 | 4/2006 | Leen et al. |
| 7,022,017 B1 | 4/2006 | Halbritter et al. |
| 7,029,394 B2 | 4/2006 | Leen et al. |
| 7,033,276 B2 | 4/2006 | Walker et al. |
| 7,034,683 B2 | 4/2006 | Ghazarian |
| 7,035,653 B2 | 4/2006 | Simon et al. |
| 7,040,987 B2 | 5/2006 | Walker et al. |
| 7,042,360 B2 | 5/2006 | Light et al. |
| 7,042,391 B2 | 5/2006 | Meunier et al. |
| 7,043,641 B1 | 5/2006 | Martinek et al. |
| 7,047,197 B1 | 5/2006 | Bennett |
| 7,056,217 B1 | 6/2006 | Pelkey et al. |
| 7,081,815 B2 | 7/2006 | Runyon et al. |
| 7,097,562 B2 | 8/2006 | Gagner |
| 7,102,507 B1 | 9/2006 | Lauren |
| 7,102,509 B1 | 9/2006 | Anders et al. |
| 7,124,947 B2 | 10/2006 | Storch |
| 7,125,334 B2 | 10/2006 | Yamazaki et al. |
| 7,128,482 B2 | 10/2006 | Meyerhofer et al. |
| 7,144,011 B2 | 12/2006 | Asher et al. |
| 7,147,558 B2 | 12/2006 | Giobbi |
| 7,158,798 B2 | 1/2007 | Lee et al. |
| 7,168,626 B2 | 1/2007 | Lerch et al. |
| 7,185,360 B1 | 2/2007 | Anton et al. |
| 7,194,273 B2 | 3/2007 | Vaudreuil |
| 7,207,885 B2 | 4/2007 | Longman |
| 7,228,651 B1 | 6/2007 | Saari |
| 7,229,354 B2 | 6/2007 | McNutt et al. |
| 7,229,385 B2 | 6/2007 | Freeman et al. |
| 7,233,922 B2 | 6/2007 | Asher et al. |
| 7,248,852 B2 | 7/2007 | Cabrera et al. |
| 7,270,605 B2 | 9/2007 | Russell et al. |
| 7,284,708 B2 | 10/2007 | Martin |
| 7,288,025 B1 | 10/2007 | Cumbers |
| 7,288,028 B2 | 10/2007 | Rodriquez et al. |
| 7,290,264 B1 | 10/2007 | Powers et al. |
| 7,297,062 B2 | 11/2007 | Gatto et al. |
| 7,306,514 B2 | 12/2007 | Amaitis et al. |
| 7,311,605 B2 | 12/2007 | Moser |
| 7,311,606 B2 | 12/2007 | Amaitis et al. |
| 7,316,619 B2 | 1/2008 | Nelson |
| 7,341,517 B2 | 3/2008 | Asher et al. |
| 7,357,717 B1 | 4/2008 | Cumbers |
| 7,394,405 B2 | 7/2008 | Godden |
| 7,413,513 B2 | 8/2008 | Nguyen et al. |
| 7,429,215 B2 | 9/2008 | Rozkin |
| 7,435,179 B1 | 10/2008 | Ford |
| 7,437,147 B1 | 10/2008 | Luciano, Jr. |
| 7,442,124 B2 | 10/2008 | Asher et al. |
| 7,452,273 B2 | 11/2008 | Amaitis et al. |
| 7,452,274 B2 | 11/2008 | Amaitis et al. |
| 7,458,891 B2 | 12/2008 | Asher et al. |

(56) References Cited

U.S. PATENT DOCUMENTS

| | | | |
|---|---|---|---|
| 7,460,863 B2 | 12/2008 | Steelberg et al. |
| 7,479,065 B1 | 1/2009 | McAllister et al. |
| 7,506,172 B2 | 3/2009 | Bhakta |
| 7,510,474 B2 | 3/2009 | Carter |
| 7,534,169 B2 | 5/2009 | Amaitis et al. |
| 7,546,946 B2 | 6/2009 | Hefner et al. |
| 7,549,576 B2 | 6/2009 | Alderucci et al. |
| 7,549,756 B2 | 6/2009 | Willis et al. |
| 7,562,034 B2 | 7/2009 | Asher et al. |
| 7,566,270 B2 | 7/2009 | Amaitis et al. |
| 7,637,810 B2 | 12/2009 | Amaitis et al. |
| 7,665,668 B2 | 2/2010 | Philips |
| 7,686,687 B2 | 3/2010 | Cannon et al. |
| 7,689,459 B2 | 3/2010 | Capurso et al. |
| 7,736,221 B2 | 6/2010 | Black et al. |
| 7,742,972 B2 | 6/2010 | Lange et al. |
| 7,744,002 B2 | 6/2010 | Jones et al. |
| 7,828,652 B2 | 11/2010 | Nguyen et al. |
| 7,867,083 B2 | 1/2011 | Wells et al. |
| 7,946,917 B2 | 5/2011 | Kaminkow et al. |
| 7,967,682 B2 | 6/2011 | Huizinga |
| 8,016,667 B2 | 9/2011 | Benbrahim et al. |
| 8,047,914 B2 | 11/2011 | Morrow |
| 8,123,616 B2 | 2/2012 | Wells et al. |
| 8,142,283 B2 | 3/2012 | Lutnick |
| 8,267,789 B2 | 9/2012 | Nelson |
| 8,285,484 B1 | 10/2012 | Lau |
| 8,298,078 B2 | 10/2012 | Sutton et al. |
| 2001/0018663 A1 | 8/2001 | Dusell et al. |
| 2001/0026610 A1 | 10/2001 | Katz et al. |
| 2001/0026632 A1 | 10/2001 | Tamai |
| 2001/0027130 A1 | 10/2001 | Namba et al. |
| 2001/0028308 A1 | 10/2001 | De La Huerga |
| 2001/0031663 A1 | 10/2001 | Johnson |
| 2001/0036858 A1 | 11/2001 | McNutt et al. |
| 2001/0049275 A1 | 12/2001 | Pierry et al. |
| 2001/0055991 A1* | 12/2001 | Hightower ............... 463/41 |
| 2002/0002075 A1 | 1/2002 | Rowe |
| 2002/0013827 A1 | 1/2002 | Edstrom et al. |
| 2002/0034978 A1 | 3/2002 | Legge et al. |
| 2002/0037767 A1 | 3/2002 | Ebin |
| 2002/0049909 A1 | 4/2002 | Jackson et al. |
| 2002/0052231 A1 | 5/2002 | Fioretti |
| 2002/0065097 A1 | 5/2002 | Brockenbrough |
| 2002/0068631 A1 | 6/2002 | Raverdy |
| 2002/0073021 A1 | 6/2002 | Ginsberg et al. |
| 2002/0074725 A1 | 6/2002 | Stern |
| 2002/0087505 A1 | 7/2002 | Smith |
| 2002/0095586 A1 | 7/2002 | Doyle et al. |
| 2002/0111210 A1 | 8/2002 | Luciano |
| 2002/0111213 A1 | 8/2002 | McEntee et al. |
| 2002/0119817 A1 | 8/2002 | Behm |
| 2002/0123377 A1 | 9/2002 | Shulman |
| 2002/0124182 A1 | 9/2002 | Basco |
| 2002/0125886 A1 | 9/2002 | Bates et al. |
| 2002/0128057 A1 | 9/2002 | Walker et al. |
| 2002/0132663 A1 | 9/2002 | Cumbers |
| 2002/0142839 A1 | 10/2002 | Wolinsky |
| 2002/0142844 A1 | 10/2002 | Kerr |
| 2002/0142846 A1 | 10/2002 | Paulsen |
| 2002/0143960 A1 | 10/2002 | Goren |
| 2002/0143991 A1 | 10/2002 | Chow et al. |
| 2002/0147047 A1 | 10/2002 | Letovsky |
| 2002/0147049 A1 | 10/2002 | Carter, Sr. |
| 2002/0151344 A1 | 10/2002 | Tanskanen |
| 2002/0155884 A1 | 10/2002 | Updike |
| 2002/0157090 A1 | 10/2002 | Anton, Jr. |
| 2002/0160834 A1 | 10/2002 | Urie et al. |
| 2002/0160838 A1 | 10/2002 | Kim |
| 2002/0165020 A1 | 11/2002 | Koyama |
| 2002/0174336 A1 | 11/2002 | Sakakibara et al. |
| 2002/0183105 A1 | 12/2002 | Cannon et al. |
| 2002/0184653 A1 | 12/2002 | Pierce et al. |
| 2002/0191017 A1 | 12/2002 | Sinclair |
| 2002/0198044 A1 | 12/2002 | Walker |
| 2003/0003988 A1 | 1/2003 | Walker et al. |
| 2003/0003997 A1 | 1/2003 | Vuong et al. |
| 2003/0006931 A1 | 1/2003 | Mages |
| 2003/0008662 A1 | 1/2003 | Stern et al. |
| 2003/0009603 A1 | 1/2003 | Ruths et al. |
| 2003/0013438 A1 | 1/2003 | Darby |
| 2003/0013513 A1 | 1/2003 | Rowe |
| 2003/0014639 A1 | 1/2003 | Jackson et al. |
| 2003/0017871 A1 | 1/2003 | Urie et al. |
| 2003/0027631 A1 | 2/2003 | Hedrick et al. |
| 2003/0028567 A1 | 2/2003 | Carlson |
| 2003/0031321 A1 | 2/2003 | Mages |
| 2003/0032407 A1 | 2/2003 | Mages |
| 2003/0032434 A1 | 2/2003 | Willner et al. |
| 2003/0032474 A1 | 2/2003 | Kaminkow et al. |
| 2003/0036425 A1 | 2/2003 | Kaminkow et al. |
| 2003/0036428 A1 | 2/2003 | Aasland |
| 2003/0040324 A1 | 2/2003 | Eldering et al. |
| 2003/0045353 A1 | 3/2003 | Paulsen et al. |
| 2003/0045354 A1 | 3/2003 | Giobbi |
| 2003/0045358 A1 | 3/2003 | Leen et al. |
| 2003/0054878 A1 | 3/2003 | Benoy et al. |
| 2003/0060286 A1 | 3/2003 | Walker |
| 2003/0064712 A1 | 4/2003 | Gaston |
| 2003/0064798 A1 | 4/2003 | Grauzer et al. |
| 2003/0064805 A1 | 4/2003 | Wells |
| 2003/0064807 A1 | 4/2003 | Walker et al. |
| 2003/0069071 A1 | 4/2003 | Britt et al. |
| 2003/0069940 A1 | 4/2003 | Kavacheri et al. |
| 2003/0078101 A1 | 4/2003 | Schneider et al. |
| 2003/0087652 A1 | 5/2003 | Simon et al. |
| 2003/0087701 A1 | 5/2003 | Paravia et al. |
| 2003/0104851 A1 | 6/2003 | Merari |
| 2003/0104865 A1 | 6/2003 | Itkis et al. |
| 2003/0109306 A1 | 6/2003 | Karmarkar |
| 2003/0109310 A1 | 6/2003 | Heaton et al. |
| 2003/0114218 A1 | 6/2003 | McClintic |
| 2003/0130032 A1 | 7/2003 | Martinek et al. |
| 2003/0139190 A1 | 7/2003 | Steelberg |
| 2003/0140131 A1 | 7/2003 | Chandrashekhar |
| 2003/0148809 A1 | 8/2003 | Nelson |
| 2003/0148812 A1 | 8/2003 | Paulsen et al. |
| 2003/0157976 A1 | 8/2003 | Simon |
| 2003/0162580 A1 | 8/2003 | Cousineau |
| 2003/0162593 A1 | 8/2003 | Griswold et al. |
| 2003/0162594 A1 | 8/2003 | Rowe |
| 2003/0165293 A1 | 9/2003 | Abeles et al. |
| 2003/0173408 A1 | 9/2003 | Mosher et al. |
| 2003/0176162 A1 | 9/2003 | Planki |
| 2003/0176218 A1 | 9/2003 | LeMay |
| 2003/0177187 A1 | 9/2003 | Levine et al. |
| 2003/0177347 A1 | 9/2003 | Schneier et al. |
| 2003/0190944 A1 | 10/2003 | Manfredi et al. |
| 2003/0195037 A1 | 10/2003 | Voung et al. |
| 2003/0195043 A1 | 10/2003 | Shinners et al. |
| 2003/0195841 A1 | 10/2003 | Ginsberg et al. |
| 2003/0208684 A1 | 11/2003 | Camacho et al. |
| 2003/0224855 A1 | 12/2003 | Cunningham |
| 2003/0228895 A1 | 12/2003 | Edelson |
| 2003/0228898 A1 | 12/2003 | Rowe |
| 2003/0228907 A1 | 12/2003 | Gatto et al. |
| 2003/0228910 A1 | 12/2003 | Jawaharla et al. |
| 2003/0236120 A1 | 12/2003 | Reece |
| 2004/0002355 A1 | 1/2004 | Spencer |
| 2004/0002383 A1 | 1/2004 | Lundy |
| 2004/0002386 A1 | 1/2004 | Wolfe et al. |
| 2004/0002843 A1 | 1/2004 | Robarts |
| 2004/0009812 A1 | 1/2004 | Scott et al. |
| 2004/0014522 A1 | 1/2004 | Walker et al. |
| 2004/0029635 A1 | 2/2004 | Giobbi |
| 2004/0034775 A1 | 2/2004 | Desjardins et al. |
| 2004/0038734 A1 | 2/2004 | Adams |
| 2004/0048613 A1 | 3/2004 | Sayers |
| 2004/0053692 A1 | 3/2004 | Chatingny et al. |
| 2004/0061646 A1 | 4/2004 | Andrews et al. |
| 2004/0063497 A1 | 4/2004 | Gould |
| 2004/0066296 A1 | 4/2004 | Atherton |
| 2004/0068441 A1 | 4/2004 | Werbitt |
| 2004/0068532 A1 | 4/2004 | Dewing |

(56) References Cited

U.S. PATENT DOCUMENTS

| | | |
|---|---|---|
| 2004/0083394 A1 | 4/2004 | Brebner et al. |
| 2004/0092306 A1 | 5/2004 | George et al. |
| 2004/0092311 A1 | 5/2004 | Weston |
| 2004/0097283 A1 | 5/2004 | Piper |
| 2004/0097287 A1 | 5/2004 | Postrel |
| 2004/0104274 A1 | 6/2004 | Kotik et al. |
| 2004/0104845 A1 | 6/2004 | McCarthy |
| 2004/0110565 A1 | 6/2004 | Levesque |
| 2004/0111369 A1 | 6/2004 | Lane et al. |
| 2004/0118930 A1 | 6/2004 | Berardi et al. |
| 2004/0127277 A1 | 7/2004 | Walker et al. |
| 2004/0127289 A1 | 7/2004 | Davis |
| 2004/0132530 A1 | 7/2004 | Rutanen |
| 2004/0137983 A1 | 7/2004 | Kerr et al. |
| 2004/0137987 A1 | 7/2004 | Nguyen et al. |
| 2004/0142744 A1 | 7/2004 | Atkinson et al. |
| 2004/0147323 A1 | 7/2004 | Cliff et al. |
| 2004/0162124 A1 | 8/2004 | Barton |
| 2004/0162144 A1 | 8/2004 | Loose |
| 2004/0186768 A1 | 9/2004 | Wakim et al. |
| 2004/0189470 A1 | 9/2004 | Girvin et al. |
| 2004/0192438 A1 | 9/2004 | Wells et al. |
| 2004/0192442 A1 | 9/2004 | Wells et al. |
| 2004/0193469 A1 | 9/2004 | Amaitis et al. |
| 2004/0193531 A1 | 9/2004 | Amaitis et al. |
| 2004/0198386 A1 | 10/2004 | Dupray |
| 2004/0198396 A1 | 10/2004 | Fransioli |
| 2004/0198403 A1 | 10/2004 | Pedersen et al. |
| 2004/0198483 A1 | 10/2004 | Amaitis et al. |
| 2004/0209660 A1 | 10/2004 | Carlson |
| 2004/0209690 A1 | 10/2004 | Bruzzese |
| 2004/0219961 A1 | 11/2004 | Ellenby |
| 2004/0224769 A1 | 11/2004 | Hansen |
| 2004/0225565 A1 | 11/2004 | Selman |
| 2004/0229685 A1 | 11/2004 | Smith |
| 2004/0229699 A1 | 11/2004 | Gentles et al. |
| 2004/0242297 A1 | 12/2004 | Walker |
| 2004/0242332 A1 | 12/2004 | Walker et al. |
| 2004/0243504 A1 | 12/2004 | Asher et al. |
| 2004/0248637 A1 | 12/2004 | Liebenberg et al. |
| 2004/0248653 A1 | 12/2004 | Barros et al. |
| 2004/0259626 A1 | 12/2004 | Akram |
| 2004/0259631 A1 | 12/2004 | Katz et al. |
| 2004/0266533 A1 | 12/2004 | Gentles et al. |
| 2005/0001711 A1 | 1/2005 | Doughty et al. |
| 2005/0003881 A1 | 1/2005 | Byng |
| 2005/0003888 A1 | 1/2005 | Asher et al. |
| 2005/0003893 A1 | 1/2005 | Hogwood et al. |
| 2005/0009600 A1 | 1/2005 | Rowe et al. |
| 2005/0014554 A1 | 1/2005 | Walker et al. |
| 2005/0020336 A1 | 1/2005 | Cesare |
| 2005/0020340 A1 | 1/2005 | Cannon |
| 2005/0026670 A1 | 2/2005 | Lardie |
| 2005/0026697 A1 | 2/2005 | Balahura |
| 2005/0027643 A1 | 2/2005 | Amaitis et al. |
| 2005/0043996 A1 | 2/2005 | Silver |
| 2005/0049949 A1 | 3/2005 | Asher et al. |
| 2005/0054439 A1 | 3/2005 | Rowe et al. |
| 2005/0059397 A1 | 3/2005 | Zhao |
| 2005/0059485 A1 | 3/2005 | Paulsen |
| 2005/0064934 A1 | 3/2005 | Amaitis et al. |
| 2005/0071481 A1 | 3/2005 | Danieli |
| 2005/0086301 A1 | 4/2005 | Eichler et al. |
| 2005/0096109 A1 | 5/2005 | McNutt et al. |
| 2005/0096133 A1 | 5/2005 | Hoefelmeyer et al. |
| 2005/0101383 A1 | 5/2005 | Wells |
| 2005/0107022 A1 | 5/2005 | Wichelmann |
| 2005/0108365 A1 | 5/2005 | Becker et al. |
| 2005/0113172 A1 | 5/2005 | Gong |
| 2005/0116020 A1 | 6/2005 | Smolucha et al. |
| 2005/0130728 A1 | 6/2005 | Ngyuen |
| 2005/0131815 A1 | 6/2005 | Fung et al. |
| 2005/0137014 A1 | 6/2005 | Vetelainen |
| 2005/0143169 A1 | 6/2005 | Nguyen et al. |
| 2005/0144484 A1 | 6/2005 | Wakayama |
| 2005/0159212 A1 | 7/2005 | Romney et al. |
| 2005/0170886 A1 | 8/2005 | Miller |
| 2005/0170890 A1 | 8/2005 | Rowe et al. |
| 2005/0170892 A1 | 8/2005 | Atkinson |
| 2005/0181859 A1 | 8/2005 | Lind et al. |
| 2005/0181862 A1 | 8/2005 | Asher et al. |
| 2005/0181870 A1 | 8/2005 | Nguyen et al. |
| 2005/0187000 A1 | 8/2005 | Miller |
| 2005/0187020 A1 | 8/2005 | Amaitis et al. |
| 2005/0192077 A1 | 9/2005 | Okuniewicz |
| 2005/0193118 A1 | 9/2005 | Le et al. |
| 2005/0193209 A1 | 9/2005 | Saunders et al. |
| 2005/0197189 A1 | 9/2005 | Schultz |
| 2005/0197190 A1 | 9/2005 | Amaitis et al. |
| 2005/0209002 A1 | 9/2005 | Blythe et al. |
| 2005/0215306 A1 | 9/2005 | O'Donnell et al. |
| 2005/0234774 A1 | 10/2005 | Dupree |
| 2005/0239523 A1 | 10/2005 | Longman et al. |
| 2005/0239524 A1 | 10/2005 | Longman et al. |
| 2005/0239546 A1 | 10/2005 | Hedrick et al. |
| 2005/0245306 A1 | 11/2005 | Asher et al. |
| 2005/0245308 A1 | 11/2005 | Amaitis et al. |
| 2005/0261061 A1 | 11/2005 | Nguyen et al. |
| 2005/0277471 A1 | 12/2005 | Russell et al. |
| 2005/0277472 A1 | 12/2005 | Gillan et al. |
| 2005/0282638 A1 | 12/2005 | Rowe et al. |
| 2005/0288937 A1 | 12/2005 | Verdiramo |
| 2006/0005050 A1 | 1/2006 | Basson et al. |
| 2006/0009279 A1 | 1/2006 | Amaitis et al. |
| 2006/0016877 A1 | 1/2006 | Bonalle et al. |
| 2006/0019745 A1 | 1/2006 | Benbrahim |
| 2006/0035707 A1 | 2/2006 | Nguyen et al. |
| 2006/0040717 A1 | 2/2006 | Lind et al. |
| 2006/0040741 A1 | 2/2006 | Grisworld et al. |
| 2006/0052153 A1 | 3/2006 | Vlazny et al. |
| 2006/0058102 A1 | 3/2006 | Nguyen et al. |
| 2006/0068917 A1 | 3/2006 | Snoddy et al. |
| 2006/0069711 A1 | 3/2006 | Tsunekawa et al. |
| 2006/0076406 A1 | 4/2006 | Frerking |
| 2006/0093142 A1 | 5/2006 | Schneier et al. |
| 2006/0095790 A1 | 5/2006 | Nguyen et al. |
| 2006/0100019 A1 | 5/2006 | Hornik et al. |
| 2006/0116198 A1 | 6/2006 | Leen et al. |
| 2006/0116199 A1 | 6/2006 | Leen et al. |
| 2006/0116200 A1 | 6/2006 | Leen et al. |
| 2006/0121970 A1 | 6/2006 | Khal |
| 2006/0121987 A1 | 6/2006 | Bortnik et al. |
| 2006/0121992 A1 | 6/2006 | Bortnik et al. |
| 2006/0131391 A1 | 6/2006 | Penuela |
| 2006/0135252 A1 | 6/2006 | Amaitis et al. |
| 2006/0135259 A1 | 6/2006 | Nancke-Krogh et al. |
| 2006/0148560 A1 | 7/2006 | Arezina et al. |
| 2006/0148561 A1 | 7/2006 | Moser |
| 2006/0160626 A1 | 7/2006 | Gatto et al. |
| 2006/0163346 A1 | 7/2006 | Lee et al. |
| 2006/0165235 A1 | 7/2006 | Carlson |
| 2006/0166740 A1 | 7/2006 | Sufuentes |
| 2006/0178216 A1 | 8/2006 | Shea et al. |
| 2006/0183522 A1 | 8/2006 | Leen et al. |
| 2006/0187029 A1 | 8/2006 | Thomas |
| 2006/0189382 A1 | 8/2006 | Muir et al. |
| 2006/0194589 A1 | 8/2006 | Saniska |
| 2006/0199649 A1 | 9/2006 | Soltys et al. |
| 2006/0205489 A1 | 9/2006 | Carpenter et al. |
| 2006/0205497 A1 | 9/2006 | Wells et al. |
| 2006/0209810 A1 | 9/2006 | Krzyzanowski et al. |
| 2006/0224046 A1 | 10/2006 | Ramadas et al. |
| 2006/0234631 A1 | 10/2006 | Dieguez |
| 2006/0234791 A1 | 10/2006 | Nguyen et al. |
| 2006/0236395 A1 | 10/2006 | Barker et al. |
| 2006/0246990 A1 | 11/2006 | Downes |
| 2006/0247026 A1 | 11/2006 | Walker et al. |
| 2006/0247039 A1 | 11/2006 | Lerner et al. |
| 2006/0247041 A1 | 11/2006 | Walker et al. |
| 2006/0247053 A1 | 11/2006 | Mattila |
| 2006/0252501 A1 | 11/2006 | Little et al. |
| 2006/0252530 A1 | 11/2006 | Oberberger et al. |
| 2006/0258429 A1 | 11/2006 | Manning et al. |
| 2006/0277308 A1 | 12/2006 | Morse et al. |

(56) References Cited

U.S. PATENT DOCUMENTS

| | | |
|---|---|---|
| 2006/0277413 A1 | 12/2006 | Drews |
| 2006/0287092 A1 | 12/2006 | Walker |
| 2006/0287098 A1 | 12/2006 | Morrow et al. |
| 2007/0001841 A1 | 1/2007 | Anders et al. |
| 2007/0003034 A1 | 1/2007 | Schultz et al. |
| 2007/0015564 A1 | 1/2007 | Walker et al. |
| 2007/0021213 A1 | 1/2007 | Foe et al. |
| 2007/0026939 A1 | 2/2007 | Asher et al. |
| 2007/0030154 A1 | 2/2007 | Aiki et al. |
| 2007/0032301 A1 | 2/2007 | Acres et al. |
| 2007/0054739 A1 | 3/2007 | Amaitis et al. |
| 2007/0060305 A1 | 3/2007 | Amaitis et al. |
| 2007/0060306 A1 | 3/2007 | Amaitis et al. |
| 2007/0060312 A1 | 3/2007 | Dempsey et al. |
| 2007/0060326 A1 | 3/2007 | Juds et al. |
| 2007/0060355 A1 | 3/2007 | Amaitis et al. |
| 2007/0060358 A1 | 3/2007 | Amaitis et al. |
| 2007/0066401 A1 | 3/2007 | Amaitis |
| 2007/0066402 A1 | 3/2007 | Amaitis |
| 2007/0087834 A1 | 4/2007 | Moser et al. |
| 2007/0087843 A1 | 4/2007 | Steil et al. |
| 2007/0093296 A1 | 4/2007 | Asher et al. |
| 2007/0099697 A1 | 5/2007 | Nelson |
| 2007/0099703 A1 | 5/2007 | Terebilo |
| 2007/0117604 A1 | 5/2007 | Hill |
| 2007/0117634 A1 | 5/2007 | Hamilton et al. |
| 2007/0136817 A1 | 6/2007 | Ngyuen |
| 2007/0167237 A1 | 7/2007 | Wang et al. |
| 2007/0168570 A1 | 7/2007 | Martin et al. |
| 2007/0181676 A1 | 8/2007 | Mateen et al. |
| 2007/0190494 A1 | 8/2007 | Rosenberg |
| 2007/0191719 A1 | 8/2007 | Yamashita et al. |
| 2007/0213120 A1 | 9/2007 | Beal et al. |
| 2007/0233585 A1 | 10/2007 | Ben Simon et al. |
| 2007/0238443 A1 | 10/2007 | Richardson |
| 2007/0238507 A1 | 10/2007 | Sobel et al. |
| 2007/0241187 A1 | 10/2007 | Alderucci et al. |
| 2007/0243927 A1 | 10/2007 | Soltys |
| 2007/0243935 A1 | 10/2007 | Huizinga |
| 2007/0257101 A1 | 11/2007 | Alderucci et al. |
| 2007/0258507 A1 | 11/2007 | Lee et al. |
| 2007/0259717 A1 | 11/2007 | Mattice et al. |
| 2007/0275779 A1 | 11/2007 | Amaitis |
| 2007/0281782 A1 | 12/2007 | Amaitis |
| 2007/0281785 A1 | 12/2007 | Amaitis |
| 2007/0281792 A1 | 12/2007 | Amaitis |
| 2007/0282959 A1 | 12/2007 | Stern |
| 2008/0004121 A1 | 1/2008 | Gatto et al. |
| 2008/0009344 A1 | 1/2008 | Graham et al. |
| 2008/0015013 A1 | 1/2008 | Gelman et al. |
| 2008/0022089 A1* | 1/2008 | Leedom ............... 713/156 |
| 2008/0026829 A1 | 1/2008 | Martin et al. |
| 2008/0026844 A1 | 1/2008 | Wells et al. |
| 2008/0032801 A1 | 2/2008 | Brunet de Courssou |
| 2008/0039196 A1 | 2/2008 | Walther et al. |
| 2008/0051193 A1* | 2/2008 | Kaminkow et al. ........ 463/25 |
| 2008/0066111 A1 | 3/2008 | Ellis et al. |
| 2008/0076505 A1 | 3/2008 | Nguyen et al. |
| 2008/0076506 A1 | 3/2008 | Nguyen et al. |
| 2008/0076572 A1 | 3/2008 | Nguyen et al. |
| 2008/0096628 A1 | 4/2008 | Czyzewski et al. |
| 2008/0096659 A1 | 4/2008 | Kreloff et al. |
| 2008/0102956 A1 | 5/2008 | Burman et al. |
| 2008/0102957 A1 | 5/2008 | Burman et al. |
| 2008/0108423 A1 | 5/2008 | Benbrahim et al. |
| 2008/0113785 A1 | 5/2008 | Alderucci et al. |
| 2008/0113786 A1 | 5/2008 | Alderucci et al. |
| 2008/0113787 A1 | 5/2008 | Alderucci et al. |
| 2008/0113816 A1 | 5/2008 | Mahaffey et al. |
| 2008/0139306 A1 | 6/2008 | Lutnick et al. |
| 2008/0146323 A1 | 6/2008 | Hardy et al. |
| 2008/0150678 A1 | 6/2008 | Giobbi et al. |
| 2008/0182644 A1 | 7/2008 | Lutnick et al. |
| 2008/0195664 A1 | 8/2008 | Maharajh et al. |
| 2008/0207302 A1 | 8/2008 | Lind et al. |
| 2008/0214261 A1 | 9/2008 | Alderucci et al. |
| 2008/0218312 A1 | 9/2008 | Asher et al. |
| 2008/0220871 A1 | 9/2008 | Asher et al. |
| 2008/0221396 A1 | 9/2008 | Graces et al. |
| 2008/0224822 A1 | 9/2008 | Gelman et al. |
| 2008/0254897 A1 | 10/2008 | Saunders et al. |
| 2008/0305856 A1 | 12/2008 | Walker et al. |
| 2008/0305867 A1 | 12/2008 | Guthrie |
| 2008/0311994 A1 | 12/2008 | Amaitis et al. |
| 2008/0318670 A1 | 12/2008 | Zinder et al. |
| 2009/0049542 A1 | 2/2009 | DeYonker et al. |
| 2009/0055204 A1 | 2/2009 | Pennington et al. |
| 2009/0088232 A1 | 4/2009 | Amaitis et al. |
| 2009/0098925 A1 | 4/2009 | Gagner et al. |
| 2009/0117989 A1 | 5/2009 | Arezina et al. |
| 2009/0149233 A1 | 6/2009 | Strause et al. |
| 2009/0163272 A1 | 6/2009 | Baker et al. |
| 2009/0178118 A1 | 7/2009 | Cedo Perpinya et al. |
| 2009/0183208 A1 | 7/2009 | Christensen et al. |
| 2009/0197684 A1 | 8/2009 | Arezina et al. |
| 2009/0204905 A1 | 8/2009 | Toghia |
| 2009/0209233 A1 | 8/2009 | Morrison |
| 2009/0325708 A9 | 12/2009 | Kerr |
| 2010/0062834 A1 | 3/2010 | Ryan |
| 2010/0069158 A1 | 3/2010 | Kim |
| 2010/0075760 A1 | 3/2010 | Shimabukuro et al. |
| 2010/0113143 A1 | 5/2010 | Gagner et al. |
| 2010/0153511 A1 | 6/2010 | Lin |
| 2010/0205255 A1 | 8/2010 | Alderucci |
| 2010/0211431 A1 | 8/2010 | Lutnick |
| 2010/0240455 A1 | 9/2010 | Gagner et al. |
| 2011/0269520 A1 | 11/2011 | Amaitis et al. |
| 2012/0190452 A1* | 7/2012 | Weston et al. ............ 463/39 |
| 2013/0005486 A1 | 1/2013 | Amaitis et al. |
| 2013/0065672 A1 | 3/2013 | Gelman et al. |
| 2013/0065679 A1 | 3/2013 | Gelman et al. |
| 2013/0072295 A1 | 3/2013 | Alderucci et al. |
| 2013/0084933 A1 | 4/2013 | Amaitis et al. |
| 2013/0165212 A1 | 6/2013 | Amaitis et al. |
| 2013/0165213 A1 | 6/2013 | Alderucci et al. |
| 2013/0165221 A1 | 6/2013 | Alderucci et al. |
| 2013/0178277 A1 | 7/2013 | Burman et al. |
| 2013/0210513 A1* | 8/2013 | Nguyen .................. 463/16 |
| 2013/0244742 A1 | 9/2013 | Amaitis et al. |
| 2014/0057724 A1 | 2/2014 | Alderucci et al. |

FOREIGN PATENT DOCUMENTS

| | | |
|---|---|---|
| DE | 37 36 770 A1 | 5/1989 |
| DE | 43 16 652 A1 | 11/1994 |
| DE | 19922862 | 12/2000 |
| DE | 19944140 | 3/2001 |
| DE | 19952691 | 5/2001 |
| DE | 19952692 | 5/2001 |
| DE | 10060079 | 6/2002 |
| EP | 0 840 639 B1 | 7/1996 |
| EP | 0 506 873 B1 | 3/2000 |
| EP | 1045346 | 10/2000 |
| EP | 1063622 | 12/2000 |
| EP | 1 066 868 A2 | 1/2001 |
| EP | 1066867 | 1/2001 |
| EP | 1120757 | 1/2001 |
| EP | 1 202 528 A3 | 5/2002 |
| EP | 1217792 | 6/2002 |
| EP | 1231577 | 8/2002 |
| EP | 1 475 755 A1 | 12/2003 |
| EP | 1 475 756 A2 | 11/2004 |
| EP | 1480102 A2 | 11/2004 |
| EP | 1 531 646 A1 | 5/2005 |
| EP | 1480102 A3 | 10/2008 |
| GB | 2 248 404 | 4/1992 |
| GB | 2 256 594 | 12/1992 |
| GB | 2 391 432 | 2/2004 |
| GB | 2 391 767 | 2/2004 |
| GB | 2394675 | 5/2004 |
| JP | H11-220766 | 1/1988 |
| JP | 5-317485 | 12/1993 |
| JP | 2000-69540 | 8/1998 |
| JP | 2000049046 | 2/2000 |

(56) References Cited

FOREIGN PATENT DOCUMENTS

| | | |
|---|---|---|
| JP | 2000-160016 | 6/2000 |
| JP | 200218125 | 7/2000 |
| JP | 200326491 | 10/2000 |
| JP | 200345435 | 11/2000 |
| JP | 200387614 | 12/2000 |
| JP | 2001-70658 | 3/2001 |
| JP | 2001-204971 | 7/2001 |
| JP | 2001-204972 | 7/2001 |
| JP | 2001/212363 | 8/2001 |
| JP | 2001 236458 | 8/2001 |
| JP | 2001-340656 | 12/2001 |
| JP | 2001-344400 | 12/2001 |
| JP | 2001-526550 | 12/2001 |
| JP | 2002 032515 | 1/2002 |
| JP | 2002-049681 | 2/2002 |
| JP | 2002-056270 | 2/2002 |
| JP | 2002107224 | 2/2002 |
| JP | 2002-109376 | 4/2002 |
| JP | 2002-66144 | 5/2002 |
| JP | 2002 133009 | 5/2002 |
| JP | 2002-135468 | 5/2002 |
| JP | 2002 189831 | 7/2002 |
| JP | 2002-253866 | 9/2002 |
| JP | 2002-263375 | 9/2002 |
| JP | 2002-292113 | 10/2002 |
| JP | 2003-053042 | 2/2003 |
| JP | 2003 078591 | 3/2003 |
| JP | 2003-518677 | 6/2003 |
| JP | 2003-210831 | 7/2003 |
| JP | 2003-210852 | 7/2003 |
| JP | 2002024979 | 8/2003 |
| JP | 2002 149894 | 5/2004 |
| JP | 2004-261202 | 9/2004 |
| JP | 2004-321558 | 11/2004 |
| JP | 2004-536638 | 12/2004 |
| JP | 2005-073711 | 3/2005 |
| JP | 2007-011420 | 1/2007 |
| RU | 2190477 | 10/2002 |
| WO | WO93/10508 | 5/1993 |
| WO | WO 94/10658 | 5/1994 |
| WO | WO 94/16416 | 7/1994 |
| WO | WO 95/30944 | 11/1995 |
| WO | WO97/19537 | 5/1997 |
| WO | WO97/44750 | 11/1997 |
| WO | WO 99/04873 A1 | 2/1999 |
| WO | WO 99/08762 A1 | 2/1999 |
| WO | WO 99/19027 | 4/1999 |
| WO | WO99/42964 | 8/1999 |
| WO | WO99/52077 | 10/1999 |
| WO | WO 99/55102 | 10/1999 |
| WO | WO 00/77753 A1 | 12/2000 |
| WO | WO 01/17262 A1 | 3/2001 |
| WO | WO 02/37246 | 5/2001 |
| WO | WO 01/40978 A2 | 6/2001 |
| WO | WO 01/48712 A1 | 7/2001 |
| WO | WO 01/48713 | 7/2001 |
| WO | WO 01/48713 A1 | 7/2001 |
| WO | WO 01/54091 | 7/2001 |
| WO | 01/67218 | 9/2001 |
| WO | WO 01/82176 | 11/2001 |
| WO | WO 01/84817 A1 | 11/2001 |
| WO | WO 01/89233 A3 | 11/2001 |
| WO | WO 02/10931 A1 | 2/2002 |
| WO | WO 02/21457 A1 | 3/2002 |
| WO | WO 02/31739 | 4/2002 |
| WO | WO 02/39605 A1 | 5/2002 |
| WO | WO 02/41199 A3 | 5/2002 |
| WO | WO 02/47042 | 6/2002 |
| WO | WO 02/065750 A2 | 8/2002 |
| WO | WO 02/071351 A2 | 9/2002 |
| WO | WO 02/077931 A1 | 10/2002 |
| WO | WO02/101486 | 12/2002 |
| WO | WO 03/005743 | 1/2003 |
| WO | WO 03/013678 A1 | 2/2003 |
| WO | WO 03/021543 | 3/2003 |
| WO | WO 03/027970 A2 | 4/2003 |
| WO | 03/045519 | 6/2003 |
| WO | 03/081447 | 10/2003 |
| WO | WO 2004/003810 A1 | 1/2004 |
| WO | WO 2004/013820 | 2/2004 |
| WO | WO 2004/014506 A1 | 2/2004 |
| WO | WO 2004/023253 A3 | 3/2004 |
| WO | WO 2004/034223 | 4/2004 |
| WO | WO 2004/073812 A2 | 9/2004 |
| WO | WO 2004/095383 | 11/2004 |
| WO | WO 2004/104763 A2 | 12/2004 |
| WO | WO 2004/114235 A1 | 12/2004 |
| WO | WO 2005/001651 | 1/2005 |
| WO | WO 2005/015458 A1 | 2/2005 |
| WO | WO 2005/022453 | 3/2005 |
| WO | WO 2005/026870 A2 | 3/2005 |
| WO | WO 2005/031627 A1 | 4/2005 |
| WO | WO 2005/031666 A1 | 4/2005 |
| WO | WO 2005/036425 A1 | 4/2005 |
| WO | WO 2005/050574 A2 | 6/2005 |
| WO | WO 2005/082011 | 9/2005 |
| WO | WO2005/098650 | 10/2005 |
| WO | 2006/023230 | 3/2006 |
| WO | WO 2007/008601 A2 | 1/2007 |
| WO | WO 2008/005264 | 1/2008 |
| WO | WO 2008/016610 | 2/2008 |

OTHER PUBLICATIONS

United States Patent and Trademark Office; Office Action for U.S. Appl. No. 11/199,835, filed Aug. 9, 2005; in the name of Lee M. Amaitis, 17 pages; Mar. 2, 2007.

Janna Lindsjö, et al.; *GIGANT—an Interactive, Social, Physical and Mobile Game*; PDC 2002 Proceedings of the Participatory Design Conference; Malmö, Sweden; 5 pages; Jun. 23-25, 2002.

Stephan Neuert, et al.; The British Library; *Delivering Seamless Mobile Services Over Bluetooth*; 11 pages; Oct. 2002.

Business Wire; *Home Gambling Network Inc., With U.S. Patent 5,800,268—Business/Gambling—HGN and UUNET, a WorldCom/MCI Company, Reach a Mutually Satisfactory Resolution in Patent Suit*; 2 pages; Mar. 19, 1999.

PR Newswire; *Nokia N-Gage (TM) Mobile Game Deck—The Revolutionary Gaming Experience; Major Global Games Publishers Excited to Publish on Wireless Multiplayer Platform*; 3 pages; Feb. 6, 2003.

Business Wire; *GoldPocket Interactive Launches EM Mobile Matrix, Industry's First Fully Synchronous Interactive Television and Massively Multi-Player Gaming Solution*; 2 pages; Mar. 17, 2003.

Brand Strategy; *The National Lottery has announced that UK consumers will be able to purchase tickets using the internet, TV and Mobile phones.* (Launches & Rebrands); ISSN 0965-9390; 1 page; Apr. 2003.

PR Newswire; *Ideaworks3D appointed by Eidos Interactive to Develop Blockbuster Line-up for Nokia N-Gage Mobile Game Deck*; 2 pages; May 23, 2003.

Telecomworldwire; *New mobile lottery service launched by mLotto*; 1 page; Oct. 30, 2003.

Singh, et al.; *Anywhere, Any-Device Gaming*; Human Interface Technology Laboratory; National University of Singapore; 4 pages; 2004.

Wu, et al; The Electronic Library; *Real Tournament—Mobile Context-Aware Gaming for the Next Generation*; vol. 22; No. 1; ISBN 0-86176-934-1; ISSN 0264-0473; 11 pages; 2004.

*Precision Marketing*; vol. 16, No. 11; ISSN 0955-0836; 2 pages; Jan. 9, 2004.

Online Reporter; *GTECH Takes Lottery Mobile*; 1 page; Feb. 28, 2004.

Personal and Ubiquitous Computing; *Human Pacman: a mobile, wide-area entertainment system based on physical, social, and ubiquitous computing*; 12 pages; May 2004.

PR Newswire; *M7 Networks Partners With Terraplay to Deliver Real-Time Multiplayer Gaming Functionality to Its Community Services Offerings*; 2 pages; Jun. 1, 2004.

China Telecom; *Win Win Gaming Inc. announces agreement to provide wireless lottery and entertainment content in Shanghai*; vol. 11, No. 9; 2 pages; Sep. 2004.

(56) References Cited

OTHER PUBLICATIONS

Business Wire; *EA Announces Next Step Into Mobile Gaming; Digital Bridges Named as Strategic Partner for Distribution of Mobile Interactive Entertainment in Europe, North and South America*; 3 pages; Sep. 2, 2004.
Wireless News; *Mobile Casinos, Lotteries Good News for Mobile Revenues*; 2 pages; Feb. 23, 2005.
Business Wire; *MobileGamingNow, Inc. Announces the Launch of the First Ever Mobile Phone Interactive, Multi-Player Gaming System for Poker*; 2 pages; Apr. 4, 2005.
Business Wire; *InfoSpace's Golf Club 3D Scores Hole-in-One for Exciting and Realistic Game Play; InfoSpace's 3D Golf Captures the Challenge and Realism of the Sport With Real-Time 3D Animation, Weather Effects, and Customizable Characters*; 2 pages; Apr. 21, 2005.
Business Wire; *July Systems' Play2Win Interactive Game Service Launched on UK's MobileGaming.com; Speedy Customer Deployments Now Possible With July's New UK Mobile Retailing Infrastructure*; 2 pages; May 4, 2005.
Gaming Labs Certified™; Standard Series; *GLI-26: Wireless Gaming System Standards*; Version: 1.1; 28 pages; Jan. 18, 2007.
*Notification of Transmittal of the International Search Report and the Written Opinion of the International Searching Authority, or the Declaration*, for International Application No. PCT/US06/26343, 8 pages, Jan. 19, 2007.
*Notification of Transmittal of the International Search Report and the Written Opinion of the International Searching Authority, or the Declaration*, for International Application No. PCT/US06/26600, 8 pages, Jan. 19, 2007.
Gaming Labs Certified™; Standard Series; *GLI-11: Gaming Devices in Casinos*; Version: 2.0; 96 pages; Apr. 20, 2007.
*Notification of Transmittal of the International Search Report and the Written Opinion of the International Searching Authority, or the Declaration* for International Application No. PCT/US06/26350, 8 pages, Apr. 27, 2007.
Gaming Labs Certified™; Standard Series; *GLI-21: Client-Server Systems*; Version: 2.1; 85 pages; May 18, 2007.
USPTO Office Action for U.S. Appl. No. 11/418,939, Dec. 17, 2007 (13 pages).
USPTO Office Action for U.S. Appl. No. 11/418,939, Aug. 20, 2008 (12 pages).
USPTO Office Action for U.S. Appl. No. 11/418,939, Apr. 10, 2007.
United States Patent and Trademark Office, Office Action for U.S. Appl. No. 11/210,482; 26 pages; Jul. 27, 2007.
*Australian Patent Office; Examination Report* for Singapore Patent Application No. 0605830-9; 5 pages; Jul. 7, 2008.
*PCT Notification of Transmittal of the International Search Report and the Written Opinion of the International Searching Authority* for International Application No. PCT/US07/66873; 4 pages; Aug. 4, 2008.
*PCT Notification of Transmittal of the International Search Report and the Written Opinion of the International Searching Authority* for International Application No. PCT/US2008/057239; 8 pages; Aug. 7, 2008.
U.S. PTO Office Action for U.S. Appl. No. 11/199,831; 9 pages; Dec. 19, 2008.
U.S. PTO Office Action for U.S. Appl. No. 11/406,783; Feb. 9, 2009.
U.S. PTO Office Action for U.S. Appl. No. 11/686,354; Oct. 1, 2009; 9 pages.
Notice of Allowance for U.S. Appl. No. 11/406,783; 6 pages; Sep. 28, 2009.
Notice of Allowance for U.S. Appl. No. 11/199,831; 5 pages; Oct. 21, 2009.
USPTO Office Action for U.S. Appl. No. 11/559,829, mailed Nov. 3, 2009, 22 pp.
USPTO Office Action for U.S. Appl. No. 11/559,933, mailed Oct. 20, 2009, 17 pp.
USPTO Office Action for U.S. Appl. No. 11/559,484, mailed Nov. 3, 2009, 31 pp.
Notice of Allowance for U.S. Appl. No. 11/686,354; Apr. 29, 2010; 6 pages.
Notice of Allowability for U.S. Appl. No. 11/199,835; Apr. 10, 2009; 2 pages.
AU Examination Report for AU Application No. 2006269413; 2 pages; Apr. 29, 2009.
Canadian Examination Report for CA Application No. 2613335; 4 pages; Mar. 29, 2010.
AU Examination Report for AU Application No. 2007216729; 5 pages; Jan. 16, 2009.
U.S. PTO Office Action for U.S. Appl. No. 11/559,829; 29 pages; Jun. 22, 2010.
AU Examination Report for AU Application No. 2007319235; Jul. 6, 2010; 2 pages.
AU Examination Report for AU Application No. 2006269416; 4 pages; Jun. 10, 2009.
U.S. PTO Office Action for U.S. Appl. No. 11/559,484; 19 pages; Jul. 20, 2010.
U.S. PTO Office Action for U.S. Appl. No. 11/559,933; 37 pages; Jul. 20, 2010.
CA Examination Report for CA Application No. 2613333; Aug. 30, 2010; 4 pages.
NZ Examination Report for NZ Application No. 577177; Dec. 17, 2010; 2 pages.
CA Examination report for CA Application No. 2596474; Nov. 15, 2010; 6 pages.
UK Office Action for Application No. 0910202.1 dated Dec. 21, 2010; 7 pages.
Notice of Allowance for U.S. Appl. No. 11/686,354; Mar. 3, 2011; 8 pages.
U.S. PTO Office Action for U.S. Appl. No. 12/247,623; 10 pages; Mar. 21, 2011.
Notice of Acceptance for AU Application No. 2006269416 dated Mar. 9, 2011; 3 pages.
Notice of Acceptance for CA Application No. 2613335 dated Apr. 4, 2011; 1 pages.
JP Office Action for Application No. 2008-520391; Feb. 1, 2011; 7 pages total with English Translation.
Notice of Acceptance for AU Application No. 2006269413 dated Feb. 7, 2011; 3 pages.
JP Office Action for Application No. 2008-520389; Jan. 18, 2011; 6 pages total with English Translation.
Notice of Allowance for U.S. Appl. No. 11/559,484; 8 pages; Nov. 23, 2010.
Notice of Allowance for U.S. Appl. No. 11/418,939; 27 pages; Mar. 9, 2009.
AU Examination Report for Application No. 2010214792 dated May 18, 2011; 2 pages.
EP Office Action for Application No. 07760844.6 dated Jan. 5, 2009; 7 pages.
Notice of Acceptance for Application No. 2010214792 dated Aug. 3, 2011; 3 pages.
U.S. PTO Office Action for U.S. Appl. No. 12/324,221 ; 13 pages; Aug. 10, 2011.
U.S. PTO Office Action for U.S. Appl. No. 12/324,269; 14 pages; Aug. 15, 2011.
U.S. PTO Office Action for U.S. Appl. No. 12/324,355; 14 pages; Aug. 18, 2011.
Notice of Allowance for U.S. Appl. No. 11/559,484; 8 pages; Jun. 20, 2011.
GB Office Action for Application No. GB0910202.1; 4 pages; Jul. 11, 2011.
Notice of Allowance for CA Application No. 2613333; 1 pages; Jul. 20, 2011.
Notice of Allowance for U.S. Appl. No. 12/324,221; 7 pages; Dec. 28, 2011.
Notice of Allowance for U.S. Appl. No. 12/324,269; 7 pages; Dec. 6, 2011.
Notice of Allowance for U.S. Appl. No. 12/324,355; 7 pages; Dec. 12, 2011.
AU Examination Report for Application No. 2011202267; 2 pages; Nov. 30, 2011.

(56) References Cited

OTHER PUBLICATIONS

Notice of Allowance for U.S. Appl. No. 11/559,484; 8 pages; Dec. 13, 2011.
Notice of Allowance for U.S. Appl. No. 12/247,623; Jan. 24, 2012; 8 pages.
U.S. PTO Office Action for U.S. Appl. No. 12/647,887; Jan. 23, 2012; 11 pages.
Notice of Allowance for U.S. Appl. No. 11/559,829; Jan. 10, 2012; 14 pages.
U.S. PTO Office Action for U.S. Appl. No. 12/792,361; Feb. 13, 2012; 14 pages.
Extended EP Search report for Application No. 07871467.2; Feb. 8, 2012; 8 pages.
U.S. PTO Office Action for U.S. Appl. No. 12/685,381 ; 8 pages; Feb. 28, 2012.
U.S. PTO Office Action for U.S. Appl. No. 11/559,933; 23 pages; Mar. 2, 2012.
JP Office Action for Application No. 2008-520389; Jan. 24, 2012; 5 pages (includes English Translation).
AU Examination Report for AU Application No. 2007319235; Mar. 13, 2012; 2 pages.
JP Office Action for Application No. 2008-520391; Apr. 10, 2012; 6 pages total with English Translation.
Notice of Acceptance for AU Application No. 2011202267; 3 pages; Mar. 6, 2012.
Notice of Allowance for U.S. Appl. No. 12/324,269; 9 pages; Mar. 22, 2012.
AU Examination report for Application No. 2011203051; May 28, 2012; 4 pages.
CA Examination Report for Application No. 2754756; 6 pages; May 29, 2012.
EP Office Action for Application No. 06786486.8; 5 pages; May 14, 2012.
EP Office Action for Application No. 06786483.5; 7 pages; May 14, 2012.
Notice of Allowance for U.S. Appl. No. 12/324,355; 10 pages; Jun. 15, 2012.
U.S. PTO Office Action for U.S. Appl. No. 12/647,887; Aug. 3, 2012; 9 Pages.
NZ Examination Report for NZ Application No. 577177; Jun. 29, 2012; 2 pages.
Notice of Allowance for U.S. Appl. No. 12/685,381; 7 pages; Sep. 12, 2012.
U.S. PTO Office Action for U.S. Appl. No. 12/792,361 ; Sep. 26, 2012; 14 pages.
U.S. PTO Office Action for U.S. Appl. No. 13/616,356; 8 pages; Dec. 4, 2012.
CA Examination report for CA Application No. 2596474; Mar. 20, 2012; 1 page.
Notice of Allowance for U.S. Appl. No. 11/559,484; 17 pages; Oct. 12, 2012.
U.S. PTO Final Office Action for U.S. Appl. No. 11/559,933; 24 pages; Dec. 6, 2012.
AU Examination Report for AU Application No. 2007319235; Apr. 16, 2012; 2 pages.
Yampolskiy et al., 2006, "Use of Behavioral Biometrics in Intrusion detection and Online Gaming", Biometric technology for Human Identification III, edited by Patrick J. Flynn, Sharath Pankanti, Proc. of SPIE vol. 6202, 62020U-1-10.
NZ Examination Report for NZ Application No. 577177; Oct. 12, 2012; 2 pages.
NZ Examination Report and Notice of Acceptance for NZ Application No. 577177; Nov. 6, 2012; 2 pages.
NZ Examination Report for NZ Application No. 600525; Jun. 14, 2012; 2 pages.
Notice of Allowance for U.S. Appl. No. 11/559,829; Oct. 9, 2012; 9 pages.
Notice of Allowance for U.S. Appl. No. 12/685,381; Jan. 9, 2013; 16 pages.
Notice of Allowance for U.S. Appl. No. 12/324,269; 27 pages; Oct. 17, 2012.
Notice of Allowance for U.S. Appl. No. 12/324,355; 34 pages; Jan. 16, 2013.
Notice of Allowance for U.S. Appl. No. 113/586,142; 8 pages; Dec. 24, 2012.
Notice of Allowance for U.S. Appl. No. 12/647,887; 35 pages; Mar. 13, 2013.
JP Office Action for Application No. 2009-506743 dated Jan. 22, 2013; 5 pages.
JP Office Action for Application No. 2009-537329 dated Feb. 26, 2013; 13 pages.
Notice of Allowance for U.S. Appl. No. 11/559,484; 11 pages; Mar. 26, 2013.
JP Office Action for Application No. 2008-520389; Apr. 9, 2013; 5 pages (includes English Translation).
Notice of Allowance for U.S. Appl. No. 11/559,829; Apr. 25, 2013; 13 pages.
Australian Examination Report for AU Application No. 2011250750, 3 pages; May 22, 2013.
EP Communication for Application No. 07871467.2; Feb. 22, 2013; 7 pages.
JP Decision to Grant a Patent for Application No. 2008-520391, 4 pages; Jun. 12, 2013; (w/ English translation).
U.S. Notice of Allowance for U.S. Appl. No. 12/647,887; 9 pages; Jun. 7, 2013.
Hiroshi Kakii, Complete illustration for understanding the latest i-mode, Gijutsu-Hyohron Co. Ltd., Sep. 29, 2000. Second Print of the first edition, p. 36-37, 48-49, 62-63, 78-83, 94-95, and 108-111.
US Office Action for U.S. Appl. No. 11/559,933; Jul. 15, 2013; 32 pages.
US Office Action for U.S. Appl. No. 13/616,535; Jul. 9, 2013; 11 pages.
U.S. Notice of Allowance for U.S. Appl. No. 12/647,887; 6 pages; Jul. 19, 2013.
Notice of Allowance for U.S. Appl. No. 12/247,623; Aug. 2, 2013; 6 pages.
US Office Action for U.S. Appl. No. 13/616,356; Aug. 15, 2013; 11 pages.
Notice of Allowance for U.S. Appl. No. 11/559,829; Aug. 23, 2013; 10 pages.
US Office Action for U.S. Appl. No. 13/616,588; Aug. 20, 2013; 17 pages.
Notice of Allowance for U.S. Appl. No. 11/559,829; Sep. 12, 2013; 10 pages.
US Office Action for U.S. Appl. No. 13/615,981; Sep. 13, 2013; 12 pages.
US Office Action for U.S. Appl. No. 13/616,492; Sep. 13, 2013; 13 pages.
US Notice of Allowance for U.S. Appl. No. 12/324,221; Sep. 20, 2013; 8 pages.
AU Examination Report No. 1 for Application No. 2012201974; Oct. 21, 2013; 3 pages.
US Notice of Allowance for U.S. Appl. No. 12/324,269; Oct. 30, 2013; 9 pages.
US Notice of Allowance for U.S. Appl. No. 13/586,142; Nov. 21, 2013; 7 pages.
CA Examination Report for App. No. 2,754,756; Dec. 30, 2013; 3 pages.
US Office Action for U.S. Appl. No. 13/849,690; Jan. 14, 2014; 13 pages.
CA Examination Report for App. No. 2,596,474; Dec. 17, 2013; 2 pages.
NZ Examination Report for App. No. 618654; Dec. 20, 2013; 2 pages.
EP Examination Report for App. No. 06786486.8; Jan. 16, 2014; 5 pages.
EP Examination Report for App. No. 06786483.5; Jan. 16, 2014; 5 pages.
EP Office Action for Application No. 06786488.4; Jan. 27, 2014; 7 pages.

(56) References Cited

OTHER PUBLICATIONS

Bahl and Padmanabhan, 2000, "RADAR: An In-Building RF-based User Location and Tracking System", Microsoft Research, p. 775-784.
AU Examination Report No. 1 for App. No. 2012258503; Feb. 24, 2014; 2 pages.
US Final Office Action for U.S. Appl. No. 13/616,356; Mar. 6, 2014; 13 pages.
US Office Action for U.S. Appl. No. 12/792,361; Mar. 7, 2014; 13 pages.
EP Decision to Refuse a European Patent for App. No. 07871467.2; Mar. 3, 2014; 20 pages.
CA Examiners Report for App. No. 2,669,836; Feb. 24, 2014; 2 pages.
US Office Action for U.S. Appl. No. 13/615,981; Jun. 24, 2014; 13 pages.
US Office Action for U.S. Appl. No. 11/210,482; May 27, 2014; 15 pages.
US Final Office Action for U.S. Appl. No. 13/616,492; May 15, 2014; 36 pages.
US Final Office Action for U.S. Appl. No. 11/559,933; May 21, 2014; 38 pages.
US Final Office Action for U.S. Appl. No. 13/616,588; May 21, 2014; 31 pages.
US Notice of Allowance for U.S. Appl. No. 13/616,535; May 30, 2014; 11 pages.

* cited by examiner

DEVICE WITH TIME VARYING SIGNAL

CROSS REFERENCE TO RELATED APPLICATIONS

This application is a continuation of U.S. patent application Ser. Nos. 12/792,361, filed Jun. 2, 2010 and Ser. No. 11/686,354 filed Mar. 15, 2007, which is a continuation in part of U.S. patent application Ser. No. 11/418,939, filed on May 5, 2006 now U.S. Pat. No. 7,549,576, all of which are incorporated in their entirety by reference herein.

FIELD OF THE INVENTION

The present invention relates generally to the field of gaming and, more particularly, to a gaming system and method incorporating a wireless network and systems and methods for providing access thereto.

BACKGROUND OF THE INVENTION

Virtual casinos are accessible via communications networks such as the Internet. For example, on-line casinos present a graphical representation of games, such as casino games, to a user on the screen of a computer in communication with the Internet. The user may place wagers, participate in the gaming, and win or lose money. Receipt of winnings, or payment of losses is typically handled through a credit account.

Participants may use gaming devices, some of which may be wireless, to access such on-line casinos. However, security of wireless gaming devices (e.g., handhelds such as the Blackberry™ handheld device) may be sub-optimal as it is typically accomplished through soft checks. For example, a user may be merely asked to enter a valid user name and associated password to provided access to a particular gaming device.

It would therefore be desirable to provide mechanisms that better guarantee secure access to wireless gaming devices and gaming systems.

SUMMARY OF THE INVENTION

Therefore, it is an object of the invention to provide mechanisms that better guarantee secure access to wireless gaming devices and gaming systems.

This and other objects are accomplished in accordance with the principles of the invention by providing gaming networks with one or more levels of security checks, such as a hard security check, instead of, or in addition to, a soft security check before access to a gaming device is granted. In a hard security check, the user employs an apparatus such as a card or other physical token that can be used to access the gaming device. Such an apparatus may communicate information that identifies the user to the device or may be used to produce a signal without which the device is locked.

In some embodiments of the present invention, a device capable of detecting or reproducing a signal from an apparatus is provided. Access to the device is provided when the signal is detected. Alternatively or additionally, the signal may include identifying information that needs to be verified in order to provide access to the device. The apparatus may include a medium for storing identifying information as well as an emitter for communicating the identifying information to the device such that access to the device is provided when the identifying information is associated with a user that is authorized to operate the device.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE INVENTION

A convenience gaming system enables participants to engage in gaming activities from remote and/or mobile locations. The possible gaming activities include gambling, such as that provided by casinos. Gambling activities may include any casino-type gambling activities including, but not limited to, slot machines, video poker, table games (e.g., craps, roulette, blackjack, pai gow poker, Caribbean stud poker, baccarat, etc), the wheel of fortune game, keno, sports betting, horse racing, dog racing, jai alai, and other gambling activities. The gaming activities can also include wagering on any type of event. Events can include, for example, sporting events, such as horse or auto racing, and athletic competitions such as football, basketball, baseball, golf, etc. Events can also include such things that do not normally involve wagering. Such events may include, without limitation, political elections, entertainment industry awards, and box office performance of movies. Gaming can also include non-wagering games and events. Gaming can also include lotteries or lottery-type activities such as state and interstate lotteries. These can include all forms of number-selection lotteries, "scratch-off" lotteries, and other lottery contests. The convenience gaming system may be implemented over a communications network such as a cellular network or a private wireless and/or wireline network. Examples of the latter include WiFi and WiMax networks. In some embodiments, the convenience gaming system communications network is entirely independent of the Internet. In other embodiments, the convenience gaming system operation makes minimal use of the Internet, such that only information for which there is no security issues is transmitted via the Internet and/or information may be encrypted. Preferably, the communications network enables players to participate in gaming from remote locations (e.g., outside of the gaming area of a casino). Also, the system may enable players to be mobile during participation in the convenience gaming activities. Preferably, the system has a location verification or determination feature, which is operable to permit or disallow gaming from the remote location depending upon whether or not the location meets one or more criteria. The criterion may be, for example, whether the location is within a pre-defined area in which gaming is permitted by law.

Figure 1:
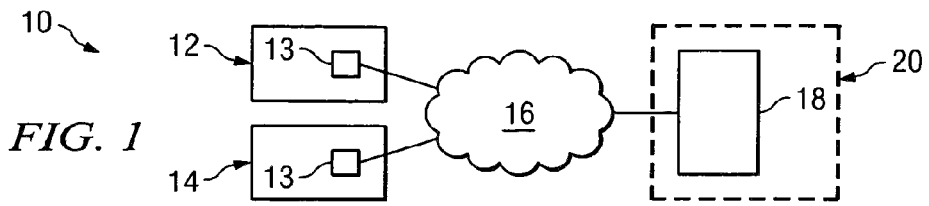
FIG. 1 illustrates a convenience gaming system according to certain embodiments of the present invention.

As shown in FIG. 1, for example, convenience gaming system 10 includes at least one user 12. The system may include additional users such that there is at least a first user 12 and a second user 14. Multiple users may access a first convenience gaming system 10, while other multiple users access a second convenience gaming system (not shown) in communication with first gaming system 10. Users 12 and 14 preferably access system 10 by way of a gaming communication device 13. Gaming communication device 13 may comprise any suitable device for transmitting and receiving electronic communications. Examples of such devices include, without limitation, mobile phones, PDAs, computers, mini-computers, etc. Gaming communication devices 13 transmit and receive gaming information to and from communications network 16. Gaming information is also transmitted between network 16 and a computer 18, such as a server, which may reside within the domain of a gaming service provider 20. The location of computer 18 is not critical, however, and computer 18 may reside adjacent to or remote from the domain of gaming service provider 20. Moreover, in certain embodiments, a gaming service provider is not required. The computer 18 and/or gaming service provider 20 may reside within, adjacent to, or remote from a gaming provider (not shown in FIG. 1). The gaming provider may be an actual controller of games, such as a casino. As an example, a gaming service provider may be located on the grounds of a casino and the computer 18 may be physically within the geographic boundaries of the gaming service provider. As discussed, however, either possibilities exist for remote location of the computer 18 and the gaming service provider 20. Computer 18 may function as a gaming server. Additional computers (not expressly shown) may function as database management computers and redundant servers, for example.

Preferably, software resides on both the gaming communication device 13 and the computer 18. Software resident on gaming communication device 13 is preferably operable to present information corresponding to gaming activities (including gambling and non-gambling activities discussed herein) to the user. The information includes, without limitation, graphical representations of objects associated with the activities, and presentation of options related to the activities and selectable by the user. The gaming communication device software is also preferably operable to receive data from the computer and data input by the user or information communicated through another device or apparatus. Software resident on the computer is preferably able to exchange data with the gaming communication device, access additional computers and data storage devices, and perform all of the functions described herein as well as functions common to known electronic gaming systems.

Gaming information transmitted across network 16 may include any information, in any format, which is necessary or desirable in the operation of the gaming experience in which the user participates. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. Some specific technologies which may be used include, without limitation, Code Division Multiple Access (CDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), or cable modem technologies. These are examples only and one of ordinary skill will understand that other types of communication techniques are within the scope of the present invention. Further, it will be understood that additional components may be used in the communication of information between the users and the gaming server. Such additional components may include, without limitation, lines, trunks, antennas, switches, cables, transmitters, receivers, computers, routers, servers, fiber optical transmission equipment, repeaters, amplifiers, etc.

In at least one embodiment, the communication of gaming information may take place through the Internet or without involvement of the Internet. In certain embodiments, a portion of the gaming information may be transmitted over the Internet. Also, some or all of the gaming information may be transmitted partially over an Internet communications path. In certain embodiments, some information is transmitted entirely or partially over the Internet, but the information is either not gaming information or is gaming information that does or does not need to be maintained secretly. For instance, data that causes a graphical representation of a table game on the user's gaming communication device might be transmitted at least partially over the Internet, while wagering information transmitted by the user might be transmitted entirely over a non-Internet communications network. As another example, identifying information associated with a hard check apparatus (e.g., a bracelet as discussed below) may or may not be transmitted from the gaming communication device to a server over the Internet.

Figure 2:
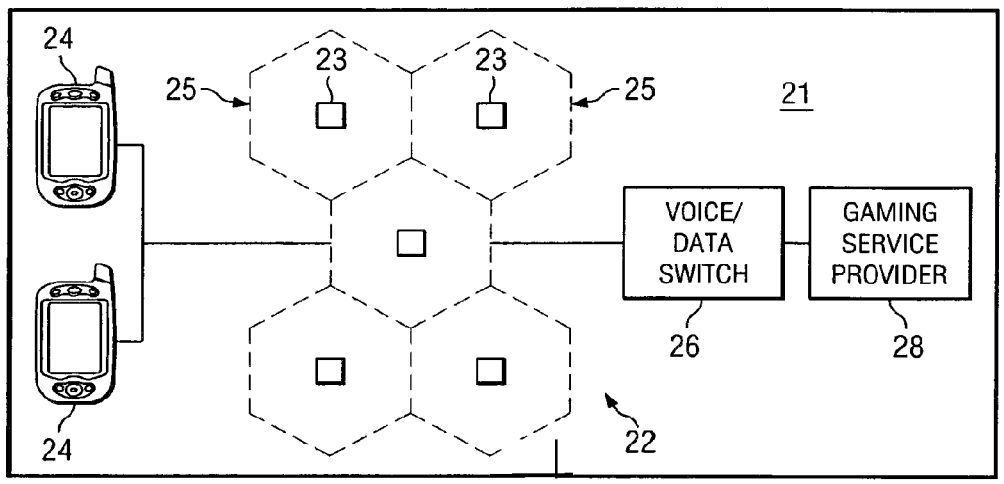
FIG. 2 illustrates a convenience gaming system with a wireless network according to certain embodiments of the present invention.

According to some embodiments of the invention, as shown in FIG. 2 for example, the communications network comprises a cellular network 22. Cellular network 22 comprises a plurality of base stations 23, each of which has a corresponding coverage area 25. Base station technology is generally known and the base stations may be of any type found in a typical cellular network. The base stations may have coverage areas that overlap. Further, the coverage areas may be sectorized or non-sectorized. The network also includes mobile stations 24, which function as the gaming communication devices used by users to access the convenience gaming system and participate in the activities available on the convenience gaming system. Users are connected to the network of base stations via transmission and reception of radio signals. The communications network also includes at least one voice/data switch, which is preferably connected to the wireless portion) of the network via a dedicated, secure landline. The communications network also includes a gaming service provider, which is likewise connected to the voice/data switch via a dedicated, secure landline. The voice/data switch may be connected to the wireless network of base stations via a mobile switching center (MSC), for example and the landline may be provided between the voice/data switch and the MSC.

Users access the convenience gaming system by way of mobile stations which are in communication with, and thus part of, the communications network. The mobile station may be any electronic communication device that is operable in connection with the network as described. For example, in this particular embodiment, the mobile station may comprise a cellular telephone.

Preferably, in the case of a cellular network for example, the convenience gaming system is enabled through the use of a private label carrier network. Each base station is programmed by the cellular carrier to send and receive private secure voice and/or data transmissions to and from mobile station handsets. The handsets are preferably preprogrammed with both gaming software and the carrier's authentication software. The base stations communicate via Private T-1 lines to a switch. A gaming service provider leases a private T-1 (or T-3 line, which routes the calls back to gaming servers controlled by the gaming service provider. Encryption can be installed on the telephones if required by a gaming regulation authority, such as a gaming commission.

The cellular network is preferably a private, closed system. Mobile stations communicate with base stations and base stations are connected to a centralized switch located within a gaming jurisdiction. At the switch, voice calls are transported either locally or via long distance. Specific service provider gaming traffic is transported from the central switch to a gaming server at a host location, which can be a casino or other location.

As subscribers launch their specific gaming application, the handset will only talk to certain base stations with cells or sectors that have been engineered to be wholly within the gaming jurisdiction. For example, if a base station is close enough to pick up or send a signal across state lines, it will not be able to communicate with the device. When a customer uses the device for gaming, the system may prohibit, if desired, the making or receiving voice calls. Moreover, voice can be eliminated entirely if required. Further, the devices are preferably not allowed to "connect" to the Internet. This ensures a high level of certainty that bets/wagers originate and terminate within the boundaries of the gaming jurisdiction and the "private" wireless system cannot be circumvented or bypassed. In certain embodiments, some data and/or voice traffic may be communicated at least partially over the Internet. In some embodiments, certain non-gaming information may be transported over a path which includes the Internet, while other information relating to the gaming activities of the system is transported on a path that does not include the Internet.

Figure 3:
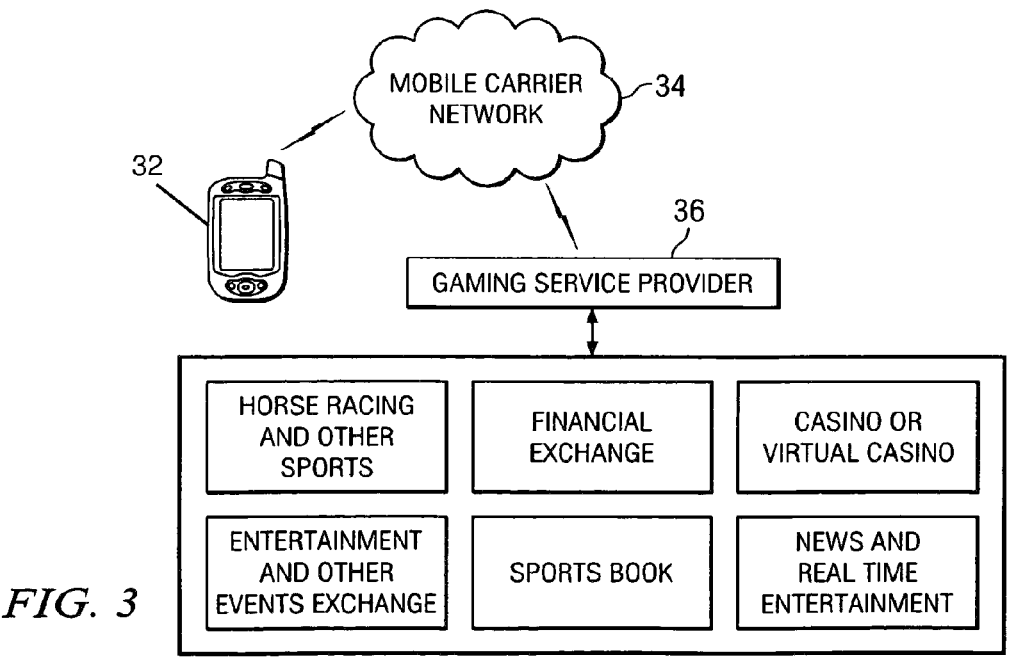
FIG. 3 is a block diagram of a convenience gaming system illustrating various gaming activities in accordance with certain embodiments of the present invention.

As shown in FIG. 3, a gaming communication device 32 is in communication with a gaming service provider over a network 34. The gaming service provider preferably has one or more servers, on which are resident various gaming and other applications. As shown in FIG. 3, some example gaming applications include horse racing and other sports, financial exchange, casino and/or virtual casino, entertainment and other events exchange, and news and real time entertainment. Each of these applications may be embodied in one or more software modules. The applications may be combined in any possible combination. Additionally, it should be understood that these applications are not exhaustive and that other applications may exist to provide an environment to the user that is associated with any of the described or potential convenience activities.

Figure 4:
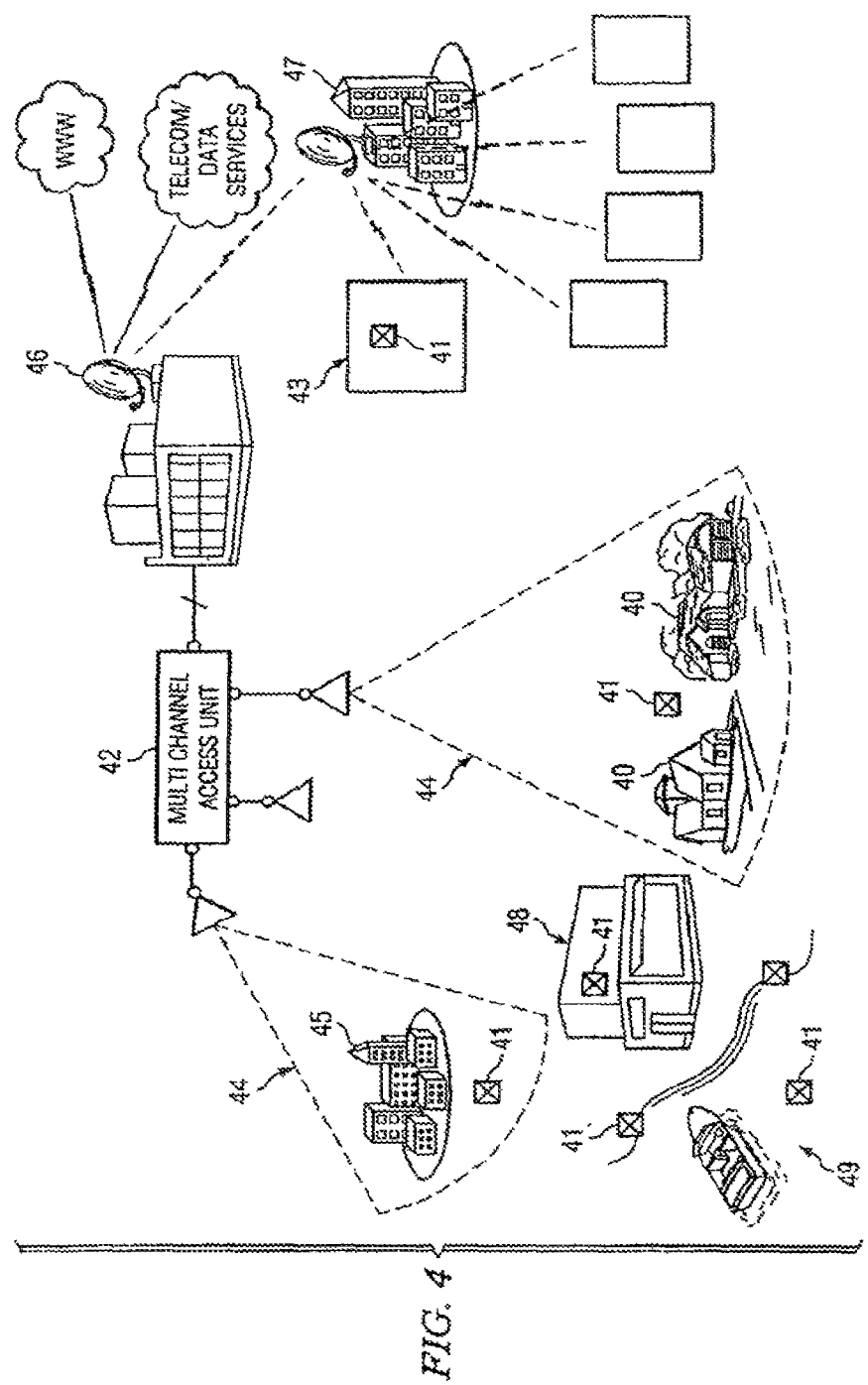
FIG. 4 illustrates a convenience gaming system showing coverage areas in accordance with certain embodiments of the present invention.

In other embodiments of the invention, as shown in FIG. 4, for example, the communications network comprises a private wireless network. The private wireless network may include, for example, an 802.11x (WiFi) network technology to cover "Game Spots" or "Entertainment Spots." In FIG. 4, various WiFi networks are indicated as networks 41. Networks 41 may use other communications protocols to provide a private wireless network including, but not limited to, 802.16x (WiMax) technology. Further, networks 41 may be interconnected. Also, a convenience gaming system may comprise a combination of networks as depicted in FIG. 4. For example, there is shown a combination of private wireless networks 16, a cellular network comprising a multi-channel access unit or sectorized base station 42, and a satellite network comprising one or more satellites 46.

With respect to the private wireless network, because the preferable technology covers smaller areas, (e.g., in the range of 100-300 feet) and provides very high-speed throughput, the private wireless network is particularly well-suited for gaming commission needs of location and identity verification for the gaming service provider products. The gaming spots enabled by networks 41 may include a current casino area 48, new areas such as swimming pools, lakes or other recreational areas 49, guest rooms and restaurants such as might be found in casino 48 or hotels 45 and 47, residential areas 40, and other remote convenience gaming areas 43. The configuration of the overall convenience gaming system depicted in FIG. 4 is intended only as an example and may be modified within the scope of the invention.

In some embodiments of the invention, the system architecture for the convenience gaming system includes:

(1) a wireless LAN (Local Access Network) component, which consists of mostly 802.11x (WiFi) and/or 802.16x WiMax technologies; robust security and authentication software; gaming software; mobile carrier approved handsets with Windows® or Symbian® operating systems integrated within; and (a) CDMA-technology that is secure for over-the-air data protection;

(b) at least two layers of user authentication, (that provided by the mobile carrier and that provided by the gaming service provider);

(c) compulsory tunneling (static routing) to gaming services;

(d) end-to-end encryption at the application layer; and (e) state-of-the-art firewall and DMZ technologies;

(2) an MWAN (Metropolitan Wireless Access Network), which consists of licensed and license-exempt, point-to-point links, as well as licensed and license-exempt, point-to-multi-point technologies;

(3) private MAN (Metropolitan Access Network) T-1 and T-3 lines to provide connectivity where wireless services cannot reach; and (4) redundant private-line communications from the mobile switch back to the gaming server.

Each of the "Game Spots" or "Entertainment Spots" are preferably connected via the MWAN/MAN back to central and redundant game servers. For accessing the private wireless networks 41, the gaming communication devices are preferably WiFi- or WiMax-enabled PDAs or mini-laptops, and do lot have to be managed by a third-party partner.

Preferably, the convenience gaming system includes a location verification feature, which is operable to permit or disable gaming from a remote location depending upon whether or not the location meets one or more criteria. The criterion may be, for example, whether the location is within a pre-defined area in which gaming is permitted by law. As another example, the criterion may be whether the location is in a no-gaming zone, such as a school. The location verification technology used in the system may include, without limitation, "network-based" and/or "satellite-based" technology. Network-based technology may included such technologies as multilateration, triangulation and geo-fencing, for example. Satellite-based technologies may include global positioning satellite (GPS) technology, for example.

As previously discussed, the cellular approach preferably includes the use of at least one cellular, mobile, voice and data network. For gaming in certain jurisdictions, such as Nevada for example, the technology may involve triangulation, global positioning satellite (GPS) technology, and/or geo-fencing to) avoid the potential for bets or wagers to be made outside Nevada state lines. In some embodiments, the network would not cover all of a particular jurisdiction, such as Nevada. For instance, the network would not cover areas in which cellular coverage for a particular base station straddled the state line or other boundary of the jurisdiction. This is done in order to permit the use of location verification to insure against the chance of bets originating or terminating outside of the state. Triangulation may be used as a method for preventing gaming from unapproved locations. Triangulation may be accomplished, for example, by comparing the signal strength from a single mobile station received at multiple base stations, each having GPS coordinates. This technology may be used to pinpoint the location of a mobile station. The location can then be compared to a map or other resource to determine whether the user of the mobile station is in an unapproved area, such as a school. Alternatively, GPS technology may be used for these purposes.

Figure 5:
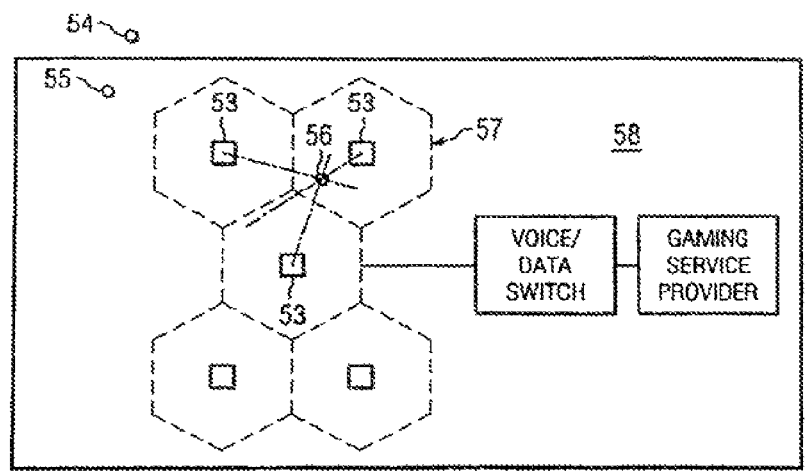
FIG. 5 illustrates a convenience gaming system with a wireless network showing triangulation location determination in accordance with certain embodiments of the present invention.

As shown in FIG. 5, the convenience gaming system includes a plurality of gaming communication devices 54, 55, and 56. Device 54 is located outside the gaming jurisdiction 58. Devices 55 and 56 are both located inside gaming jurisdiction 58. However only device 56 is located within geo-fence 57, which is established by the coverage areas of a plurality of base station 53. Thus, geo-fencing may be used to enable gaming via device 56 but disable gaming via devices 54 and 55. Even though some gaming communication devices that are within the gaming jurisdiction 58, such as device 55, are not permitted access to the convenience gaming system, the geo-fence 57 ensures that no gaming communication devices outside jurisdiction 58, such as device 54, are permitted access.

Geo-fencing does not specify location. Rather, it ensures that a mobile station is within certain boundaries. For instance, geo-fencing may be used to ensure that a mobile station beyond state lines does not access the convenience gaming system. Triangulation on the other hand specifies a pinpoint, or near-pinpoint, location. For example, as shown in FIG. 5, device 56 is triangulated between three of the base stations 53 to determine the location of device 56. Triangulation may be used to identify whether a device, such as a mobile station, is located in a specific spot where gambling is unauthorized (such as, for example, a school). Preferably, the location determination technology utilized in conjunction with the invention meets the Federal Communication Commission's (FCC's) Phase 2 E911 requirements. Geological Institute Survey (GIS) mapping may also be utilized to compare identified coordinates of a gaming communication device with GIS map features or elements to determine whether a device is in an area not authorized for gaming. It should be noted that any type of location verification may be used such as triangulation, geo-fencing, global positioning satellite (GPS) technology, or any other type of location determining technology, which can be used to ensure, or provide an acceptable level of confidence, that the user is within an approved gaming area.

In other embodiments, location verification is accomplished using channel address checking or location verification using some other identifying number or piece of information indicative of which network or portion of a network is being accessed by the gaming communication device. Assuming the using of an identifying number for this purpose, then according to one method of location checking, as an example, a participant accesses the gaming system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A server application may be resident on the mobile telephone to communicate this information via the network to the gaming service provider. In related embodiments, the identifying number for information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant gaming activity. Preferably the gaming service provider either maintains, or has access to, a database that maps the various possible worldwide mobile network identifying numbers to geographic areas. The invention contemplates using any number or proxy that indicates a network portion of a network, or network component, which is being connected with a mobile telephone. The identifying number may indicate one or more of a base station or grot p of base stations, a line, a channel, a trunk, a switch, a router, a repeater, etc.

In other embodiments of the present invention, when the user connects his telephone to the gaming server, the gaming server draws the network identifying information and communicates that information into the gaming service provider. The software resident on the gaming communication device may incorporate functionality that will, upon login or access by the user, determine the user's location (based at least in part on the identifying information) and send a message to the gaming service provider. The identifying number or information used to determine location may be country-specific, state-specific, town-specific, or specific to some other definable boundaries.

In connection with any of the location determination methods, the gaming system may periodically update the location determination information. This may be done, for example, during a gaming session, at pre-defined time intervals to ensure that movement of the gaming communication device to an unauthorized area is detected during play, and not just upon login or initial access.

Thus, depending on the location determination technology being used, the decision whether to permit or prohibit a gaming activity may be made at the gaming communication device, at the gaming server, or at any of the components of the telecommunication network being used to transmit information between the gaming communication device and the gaming server (such as at a base station, for example).

An aspect of the private wireless network related to preventing gaming in unauthorized areas is the placement of sensors, such as Radio Frequency Identification (RFID) sensors on the gaming communication devices. The sensors trigger alarms if users take the devices outside the approved gaming areas. Further, the devices may be "tethered" to immovable objects. Users might simply log in to such devices using their ID and password.

In connection with FIG. 6, an example embodiment of a method according to the invention can be described as follows. As discussed, software is preferably loaded on a gaming communication device and is operable to receive input data for gaming. The input data may originate at associated gaming software resident on the gaming server, or it may be input by the user of the gaming communication device. The software on the device is operable to present a representation of a gaming environment. This can include, among other things, a representation of a table game such as a blackjack table or a slot machine. Other examples of the representation of a gaming environment include graphical representations of any of the other applications described herein.

Figure 6:
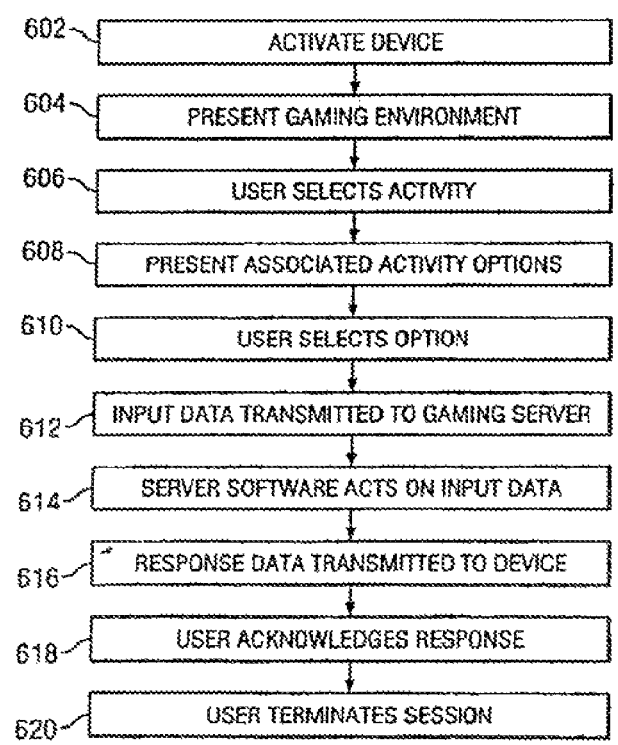
FIG. 6 is a flow chart depicting steps in a convenience gaming method according to certain embodiments of the present invention.

In the example method shown in FIG. 6, in a first step 602, the gaming communication device is activated. This may take place as a function of turning on a phone, PDA, or other communication device as described elsewhere herein. Preferably, activation comprises connecting the gaming communication device to a private data network. Part of the activation includes logging in at a prompt. This may be considered as a first level of authentication of a user of the gaming communication device. A second level of user authentication comprises authentication of the gaming communication device itself. This may occur, for example, by authentication of a mobile station by a mobile carrier. A third level of user identification may comprise biometrics. Various examples of biometrics may include, but are not limited to, fingerprint identification, photo identification, retina scanning, voice print matching, etc.

In a next step 604, the user is presented with the gaming environment. The gaming environment may be presented in various stages. For instance, in a first stage, the gaming environment may comprise a casino lobby where the user is presented with certain gaming options including, for example, table games, slots, sports book, video poker, and a casino cashier. In a subsequent stage, the user may be presented with optional instances of the type of activity selected from the casino lobby.

In a next step 606, the user selects an activity, such as a particular casino table game. In step 608, the user is presented with one or more options related to the selected activity. In step 610, the user selects an option. For instance, at this point, the user might place a wager, draw a card, select a restaurant or restaurant menu item, select a news source or a news story, place a buy or sell order on a financial exchange, place a bet on a certain box office performance over/under amount for a given movie, etc. The options for user input are myriad. In step 612, the software resident on the gaming communication device accepts the option input by the user and transmits the input data to the software resident at the gaming server. In step 614, the gaming server software acts on the input data.

Actions in this point, may include, without limitation, determining an outcome and/or amount, accessing another server and/or software application, retrieving information, preparing a response to the user, etc. The action of determining an outcome and/or amount might take place, for example, if the user is using the device to place wagers in connection with a gambling activity. For certain gambling activities, such as a table game or slot machine, a random number generator may be incorporated to determine the outcome (i.e., whether the user won or lost) and the gaming server software would also determine an amount won or lost based on the amount wagered and any applicable odds. The action of accessing another server and/or software application might occur, for example, in the event the user is engaging in a services activity such as accessing news services, making reservations and placing food and beverage orders at a restaurant, or making a retail purchase. The action of retrieving information might occur when the gaming server software is prompted to access another server for the purpose of retrieving a certain type of information requested by the user.

Preferably, the gaming server software prepares a response to the user's input data and in step 616. In step 618, the user acknowledges the response. For example, in the case of gambling, the user might acknowledge that he won a hand of blackjack because the dealer busted and that his payout was $100 based on a $50 bet at even odds. In step 620, the user logs out.

In the situation where the user is gambling, after the series of steps described in connection with FIG. 6, (or a subset or modified series of steps), the user physically enters a casino and goes to a casino cashier for payout and/or settlement (which can include, for example, extensions of credit or advance deposits). In some embodiments, there is a waiting period (e.g., twenty-four hours) before the user can collect winnings. The purpose of the waiting period is to allow time for fraud monitoring. The waiting period may depend on the amount of the balance. For example, if the user is owed less than $5,000 the waiting period may be twelve hours. If the user is owed between $5,000 and $10,000 the waiting period may be twenty-four hours. If the user is owed more than $10,000 the waiting period may be forty-eight hours.

Figure 7:
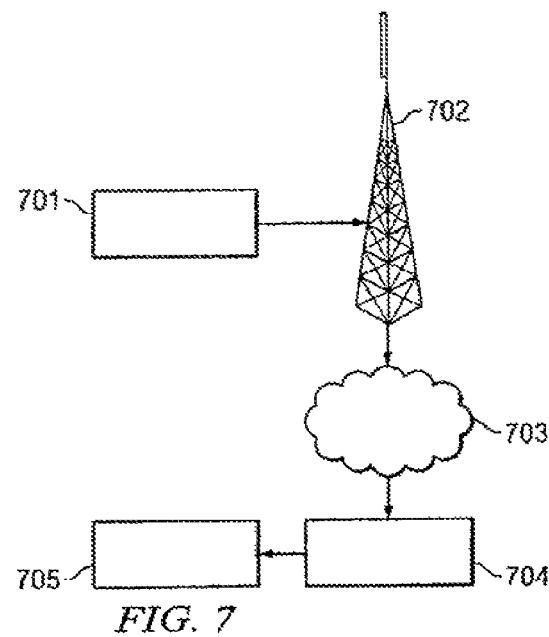
FIG. 7 depicts a convenience gaming system showing a communication path in accordance with certain embodiments of the present invention.

Preferably, data is transmitted back and forth during the convenience gaming activities between the gaming communication device and a server controlled by the gaming service provider. An example of the path of communication is shown in FIG. 7. Gaming data, such as a wager placed by the user, s transmitted from gaming communication device 701 to a base station 702 (or a transmitter in the case of a private wireless network such as a WiFi or WiMax network). Base station 702 routes the data through network 703 to a hub or gateway 704, which in turn routes the data to a gaming server 705 operated by a gaming service provider. Preferably, the communication from gaming communication device 701 to the network 703 comprises wireless communication. This may be any type of known wireless communication, or any type of wireless communication available in the future. Examples of acceptable wireless communication protocols include CDMA, GSM, and GPRS.

Preferably, the communication from the network 703 to the gateway 704 and to the server 705 are conducted over secure land line. FIG. 7 is an example communication network only and the invention should be understood to cover other networks in which data may be transmitted from gaming communication device 701 to server 705. Preferably, data in response to data being transmitted from gaming communication device 701 to server 705 is transmitted back to gaming communication device 701 along a path essentially opposite to the path of the first transmission. It should be noted that in at least certain embodiments of the methods and systems described herein, a user is not actually playing a game on the gaming communication device. Rather, the user is actually playing the game on the server controlled by the gaming service provider, which may be located within a casino, thereby interacting with the gaming device and the server. In other embodiments, the user may be playing the game on the gaming device itself or interacting solely with the device.

With respect to payment and/or receipt of winnings and losses, one possible approach is as follows. Upon check-in at a casino hotel, a hotel representative may query a guest as to whether the guest wants access to a convenience gaming device. If the guest does want such access, the hotel representative may provide the guest with a gaming communication device in exchange for a credit-card type deposit or other deposit. The guest then deposits money into an account for wireless gaming. The guest's account balance information is loaded onto the guest's account file, which is preferably maintained on the gaming server. The user may load money into his gaming account by establishing a credit account, for example, at a casino cashier and/or by paying cash to the casino cashier. Many other alternatives exist and this process is an example only. Guest accounts or gaming communication devices may be preloaded with funds. Funds may be deposited during a convenience gaming session. This may occur, for example, if a user selected a casino cashier activity from the gaming environment and instructed the cashier to add finds to the account. The finance subsystem may also utilize account card technology (such as ATM cards, credit cards, stored value cards, gift cards, etc) in order to conduct financial transactions associated with a user's account. Moreover, the user may receive or make payments remotely, by way of inputting instructions via the gaming communication device or by another remote device such as an automatic teller machine (ATM), which is in electronic communication with the gaming server or other server operated by the casino, hotel, gaming service provider or other entity involved in the convenience gaming activities. For example, a user might remotely (via the gaming communication device) place an order at a restaurant. Then, the user might make advance payment for the meal at an ATM-type machine which is operable to receive instructions corresponding to the financial transaction requirements of the convenience gaming activity of ordering food.

Electronic records of the gaming transactions undertaken by a user may be established. Preferably, this is accomplished by utilization of a keystroke log, which is an electronic record of all keystrokes made by the user. Utilization of a keystroke log in this context allows for unprecedented monitoring of a user's gaming activity. In the event of a dispute, one may refer to the keystroke log and readily determine whether, in fact, a user placed a particular wager, for example.

An additional possible aspect of the electronic record is to allow a gaming control board or other regulatory authority, access to the electronic record in a direct manner in order to conduct periodic independent monitoring of the convenience gaming activities conducted over the system. Another possible aspect is to allow policing against rigged machines. For instance, it is possible that the gaming control board (or other regulatory authority) could obtain a gaming communication device and compare their test results over time against records in the electronic record database (e.g., by comparing the results shown in the keystroke log). This essentially comprises electronic access for testing.

Figure 8:
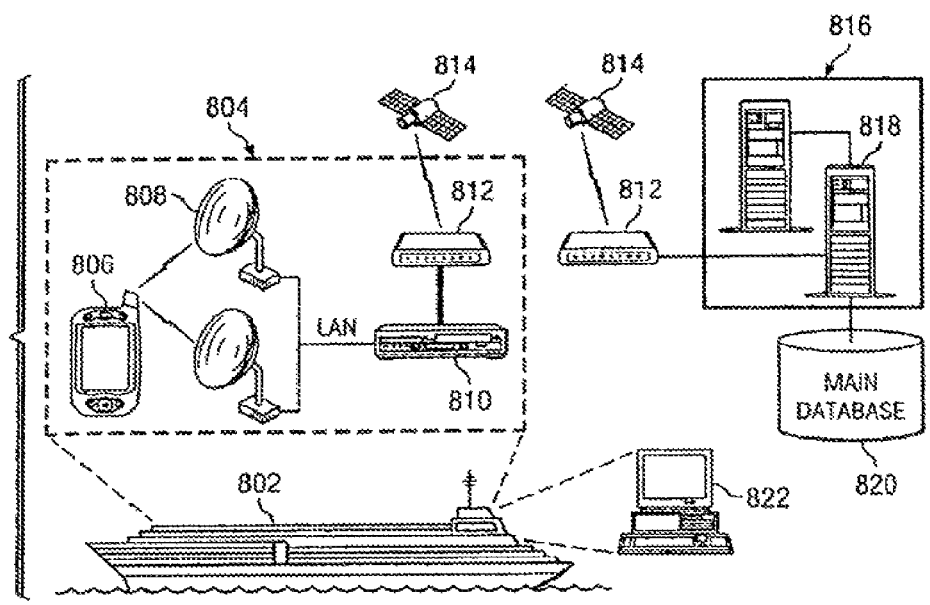
FIG. 8 illustrates a ship-based convenience gaming system in accordance with certain embodiments of the present invention.

In other embodiments of the invention, as shown in FIG. 8, a ship-based convenience gaming system is provided. The system preferably comprises passenger vessel 802, such as a cruise liner for example. The system includes one or more gaming communication devices 806 connected to a communication network. The network shown in FIG. 8 comprises a mobile network with base stations 808 connected via a LAN to (a base station controller (BSC) 810. BSC 810 is connected via a T1 interface to a first Very Small Aperture Terminal (SAT) modem 812, which is in communication with a first satellite 814. First satellite 814 is operable to transmit and receive signals from second satellite 814, which is in communication with second VSAT modem 812. Second VSAT modem 812 is in communication with a gaming server 818 located at gaming service provider 816. Gaming server is coupled to gaming database 820. Again, the network configuration depicted in FIG. 8 is for example purposes only, and other configurations are within the scope of the invention. An on-board back office 822 is preferably provided. Data is communicated by the on-board VSAT modem and transmitter to the first satellite for relay to the second (preferably land-based) VSAT receiver and modem. The data is then communicated to a server and/or centralized database via a mobile station controller (not shown).

A corresponding business model involves the gaming service provider contracting with a cruise line, which agrees to allow the gaming service provider to provide coverage throughout the cruise line's ship(s), by using repeaters for example. The gaming service provider may provide a private wireless network, in which case any revenue generated from use of or access to the private wireless network, and revenue from gaming activities, may be allocated among all or any subset of the cruise line and the gaming service provider. Alternatively, the gaming service provider may contract with a mobile carrier and a satellite provider, in which case revenue from the mobile calls, and revenue from gaming activities, may be allocated among all or any subset of the cruise line, the mobile carrier and the gaming service provider.

There are several scenarios for a user's activity relative to transactions conducted over the convenience gaming system. In one example scenario the user is in a fixed, but remote, location from the gaming server, which may be located on the premises of a casino. This may be include, for instance, a situation in which the gaming communication device is a kiosk or some other communication device which is in a fixed position or which is tethered to a fixed position so that the gaming communication device cannot be moved beyond a certain area. In another example scenario, the user starts a convenience gaming transaction at a first location and ends the transaction at a second location different from the first location. In another example scenario, the user is mobile during a single convenience gaming transaction. In another example scenario, the user is mobile within a first approved area then (during the convenience gaming transaction) the user moves outside the first approved area, through an unapproved area, to a remote second approved area.

In another example embodiment, the convenience gaming system may be used to enable gaming activities involving multiple wireless users who interact with one another. For instance, the system may enable a table game (such as blackjack) in which a first user and a second user are conducting gaming transactions on the same table and in which options selected by the first user directly impact outcomes and options relative to the second user. Preferably, the gaming environment presented on the gaming communication devices of both the first and second users will indicate the existence and activity of the other respective user. Another example of multiple users interacting on the convenience gaming system is the provision of a poker game in which users place bets against one another instead of, or in addition to, placing bets against the house. Another example of interaction between users is when a first user makes restaurant reservations or purchases event tickets, thereby reducing the options available to the second user.

Preferably, the gaming service provider provides at least the following functions. First, the gaming service provider provides and controls the one or more gaming servers. These servers may be physically located within the confines of the gaming service provider or may exist at a remote location. As mentioned, the gaming servers may also be located at or near a games provider such as a casino, casino hotel, racino, cruise ship, race track, etc. The gaming service provider may also provide monitoring services such as transaction monitoring and key stroke logging services. The gaming service provider may also provide data management and security services. These services are not intended to be exhaustive and the gaming service provider may provide other services which facilitate the convenience gaming process.

It should be noted that the invention can be implemented in connection with any gaming environment or an environment for any other activity, which may be conducted electronically. The invention is not limited to Nevada or any other particular gaming jurisdiction. For instance, the invention can be employed in connection with casinos in Atlantic City, N.J., international jurisdictions, Native American gaming facilities, and "racinos" which are race tracks that also have slot machines, video lottery terminals, or other gambling devices. For example, in connection with "racinos," the invention might be used by participants who wish to play slot machine games while they are viewing race horses in the paddock area. This might be desirable in the event that the slot machine area does not allow smoking and a participant wishes to gamble from an outdoor smoking area. Alternatively, the slot machine area might permit smoking and the gambler wishes to play the slot machines from an area where he or she can avoid breathing second-hand smoke. Numerous other scenarios can be envisioned in which the gaming participant can use the invention to participate in remote gaming, while enjoying some other primary activity in a location remote from the gaming facility.

Further, the invention is not limited to gaming, but can include other applications, such as trading financial instruments, and wagering on other types of events, such as elections, award events, or any other activity. More specifically, although the invention is described in the context of remote and/or mobile gaming, the principles of the invention are applicable to any system or method that uses wireless communications or other portable devices including handheld devices such as personal digital (or data) assistants (PDAs), computers, mini-computers, pagers, wireless terminals, mobile telephones, etc. Such systems may include electronic trading systems such as those used for trading financial instruments or any commodities.

In at least one embodiment, the invention provides jurisdictional controls, which limit gaming to approved geographical areas. The invention may also include an age/identity verification feature. This can be accomplished through any applicable technique including retina scanning, finger print identification, voice print matching, or other biometrics. Identity verification can also be accomplished by having a customer take a picture of himself (e.g., by use of a digital picture phone) and transmitting the picture to the gaming service provider for comparison to a stored picture of the pre-approved user. Identity verification can also be accomplished by way of comparison of participant provided data to stored data, and execution of electronic agreements or contracts by the participant. The invention may also provide for the logging of keystrokes. In at least one embodiment, all communications are accomplished without accessing the Internet.

Mobile, remote gaming may be desirable for many reasons, some of which have already been described. The invention may allow supplementation of existing in-house gaming revenue by allowing bettors to place bets while enjoying other leisure activities such as golf, swimming, dining and shows. The invention may complement the new coinless wagering environment as bettors can play their favorite games outside the casino. The invention provides a high-speed, reliable, accurate, and secure mobile gaming environment that complies with regulatory requirements for identification and location verification of the bettor with the ability to generate key stroke logs. The invention may restrict unauthorized usage from a geographic perspective and is capable of implementation using location verification technology (e.g., geo fencing) to conform the gaming activities to legal parameters.

Consumers may benefit from an increased choice of gaming environments. Consumers will be able to bet in whatever surroundings they prefer, benefiting from the knowledge that the product is regulated, fair and secure while enjoying the gaming experience at the speed they choose without external influences, such as that which might occur within the in-house casino environment. The gaming businesses can use the invention to increase their revenue base through a new, regulated, mobile, remote channel. Customers wanting to be entertained during downtime or outside a casino will be able to play games on their gaming communication device and customers intimidated by a traditional casino environment will be able to play in private. The gaming jurisdictions may benefit from an increase in gaming an ancillary revenue growth because customers will have a more enjoyable experience.

The invention may also be used to deliver content at an increased speed compared to traditional telecommunications systems. The content may include, for example, live reports, entertainment, news, promotions and advertising.

As mentioned above, the invention provides a mobile gaming environment that complies with regulatory requirements for identification and location verification of the bettor. Moreover, the system is designed to be one hundred percent "clean" from a regulatory perspective. The software is clean in that it has not been and will not be licensed to anyone who does business illegally or otherwise operates in a "gray" area. For example, in a preferred embodiment, the software is not licensed to an entity that will illegally operate the software, or otherwise illegally do business on, the Internet. This may be desirable in that certain gaming jurisdictions will not grant gaming permits or licenses to companies that do business with, or license technology to or from, other entities known to be engaging in illegal operations.

Preferably, the system is designed such that the gaming software (or other application software operating on the system) is also one hundred percent clean from a regulatory perspective. For instance, before granting a license, a gaming jurisdiction may require that the software being used is not tainted in that it has not been used by the license applicant in violation of any laws and has not been licensed or otherwise distributed or disseminated to others who have used the software for illegal purposes, or who have been engaging in illegal activity. Therefore, it is preferred that the gaming software be clean and untainted from this perspective.

The systems and methods described herein may also be used to deliver and/or access "Rich Media" content such as, for example, sports video (live or nearly live) and audio commentary. Such may often only be distributed within specific jurisdictions. Therefore, the distribution may benefit from the inventive aspects discussed herein, particularly the location verification aspect, such as geofencing.

The gaming system and methods described herein may permit, among other things, pari-mutuel wagering, sports betting, and dissemination of news and other content. The invention also enables a casino or other gaming provider to advertise ancillary services such as shows, bars, and restaurants. The invention also enables remote reservations and purchases in connection with such services.

According to some embodiments of the invention, the convenience gaming system provides for the dissemination of real-time odds to users accessing the system.

In other embodiments, an outcome in one transaction can trigger the presentation to the user of options for a second transaction. For example, if a user wins a predetermined amount of money playing blackjack, the user might be presented with an option to purchase retail items at a casino store or to make reservations for certain services at a club. As another example, if a user uses the system to purchase show tickets, the user might be offered to make reservations at one of several restaurants within a certain proximity to the show.

In some embodiments of the invention, access to the gaming device may be restricted unless a soft check and/or a hard check are performed. For example, in a soft check process, a user may be required to enter a valid user name and associated password, whereas in a hard check mechanism, the user may employ a physical token such as a card that identifies the user to the gaming device.

Figures 9, 10, 11:
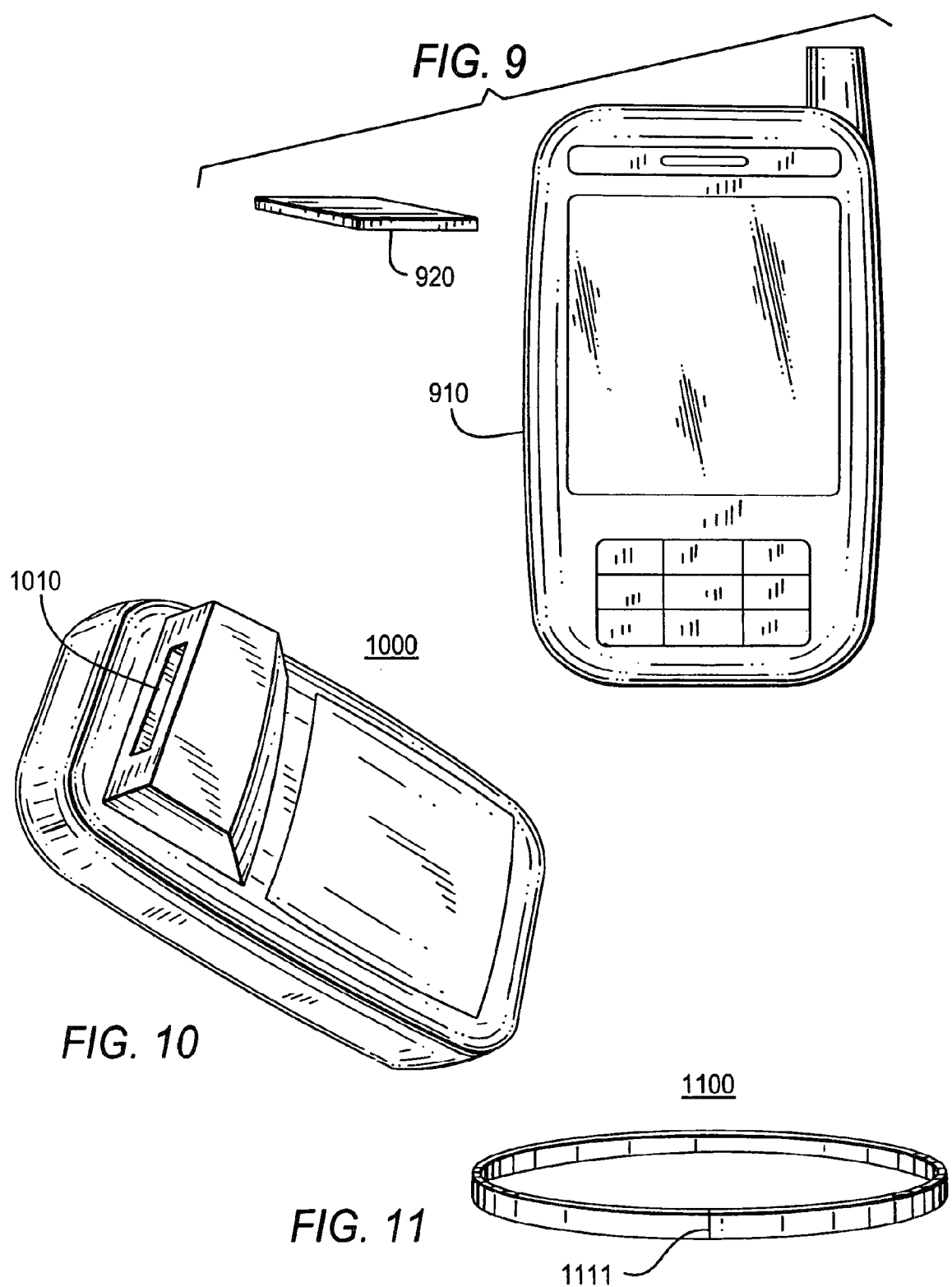
FIG. 9 illustrates a convenience gaming device and apparatus for use in accordance with certain embodiments of the present invention.
FIG. 10 illustrates a convenience gaming device and apparatus in accordance with certain embodiments of the present invention.
FIG. 11 illustrates another convenience gaming device in accordance with certain embodiments of the present invention.

FIG. 9 illustrates an apparatus 920 to be used in conjunction with a gaming device 910 as part of a hard check mechanism according to the invention. Apparatus 920 may include any of a card which bears a magnetic strip (such as a credit card), a key that includes an RFID transponder, a limited-distance signal emitted or other transponder, a smart card that has a microprocessor or other circuit or "chip", a bracelet or wristband which includes a signal transmitter such as an RFID signal transmitter, or which includes a magnetically encoded signal, a substrate that bears a bar code or other optically readable identifier, or any combination of the same.

For example, in some embodiments of the invention, apparatus 920 may be a magnet or a card bearing a magnetic strip (such as a credit card) or a smart card that has a microprocessor or other circuit or "chip" and which may be read by card reader 1010, which is part of gaming device 1000, as depicted in FIG. 10. Alternatively, such a card may be read by a contact-less device (e.g., a signal reader which receives and interprets signals transmitted by the card).

Apparatus 920 may therefore be capable of producing a signal that is detectable by a gaming communication device such that access to the gaming device is provided when the signal is detected. Access to the gaming device may be provided for a predetermined period of time after the signal is initially detected or so long as the signal continues to be detected. The signal produced by apparatus 920 may additionally or alternatively communicate identifying information stored on the apparatus. Such information may be communicated through a transponder or any other suitable emitter. Access to the gaming device may be provided when the identifying information is associated with a user that is authorized to operate the gaming communication device. Such identifying information may be stored on apparatus 920.

Moreover, the signal produced by apparatus 920 may additionally or alternatively communicate characteristics associated with the authorized user. These characteristics may include the average volume wagered by the user, whether the user is a high-volume, medium-volume or low-volume wagerer, the user's wagering performance, whether the user is a member of a club affiliated with the organization that distributed the apparatus to the user. User characteristics may be stored and updated on apparatus 920 and/or device 910 as the user enters into more wagers and transactions, thereby enabling the provision of yet another layer of security for the device. For example, even after the initial soft and hard checks are successful, the user may subsequently be denied access to device 910 if the updated information does not fall within a predetermined range of acceptable characteristics or does not substantially match ongoing wagering requirements within a predetermined degree of tolerance. Alternatively or additionally, a certain number of deviation occurrences, which may be communicated by device 910 or merely calculated based on the updated characteristics as communicated by device 910, may trigger an alarm signal generated at a security center. This signal may lead to increased surveillance of the user or may cause security or gambling facility personnel to take action vis-a-vis the user.

Alternatively, the signal produced by apparatus 920 may be compatible with a certain class of devices (e.g., gaming devices associated with a relatively higher limit, if at all, on the amounts allowed to be wagered). Before being provided with the apparatus, a user may be required to provide identifying information (e.g., a user I.D.). Upon receipt of this information, a provider such as a gambling facility, may retrieve a user record or profile containing characteristics associated with the user and the information provided. The user may then be provided with an apparatus that corresponds to the retrieved characteristics. An example of such a verification process relating to wagering is discussed below.

In some embodiments of the invention, apparatus 920 does not produce any signal. Instead, apparatus 920 may be a storage device or storage medium such as tape, memory, a disk, etc. and gaming device 910 may have a reader capable of extracting information such as a compact disk or other disk or tape reader, or any other card reader or device capable of extracting information stored on such a storage mechanism.

In some embodiments of the invention, apparatus 920 may also serve other functions. In addition to, or as an alternative to, securing access to a wireless gaming device, apparatus 920 may use the same mechanisms described herein to communicate with a gaming station or other interface. For example, apparatus 920 may be associated with information that grants the user access to certain non-mobile gaming devices, certain areas within a casino or a hotel, a particular nightclub or restaurant, a particular room or suite, etc., or serve as a user or player tracking card, e.g., a "comp card".

In other embodiments of the invention, apparatus 920 may be a bracelet or wristband such as bracelet 1100 depicted in FIG. 11. Bracelet 1100 can be made of many types of material, such as rubber, plastic, metal or any combination thereof. Bracelet 1100 may be adapted for single-use or multiple uses. The ends of the bracelet may be attachable at point 1111 such that the bracelet can be affixed to or worn on, e.g., the wrist of a user of the game device. For example, bracelet 1100 may have adhesive on one end, allowing that end to be adhered to the other end when the bracelet is formed into a loop around the user's wrist.

The bracelet may include a chip, transmitter or transponder which emits a signal that identifies the user (e.g., by emitting a signal that represents a unique identifier such as a signal that represents a sequence of alphanumeric characters). In such embodiments, the bracelet, when worn by a user of the gaming device, can emit a signal that is received by the gaming device, which in turn informs the gaming device that the wireless gaming device is being used by an authorized user (e.g., the user associated with the unique identifier transmitted by the bracelet).

The bracelet may operate only for the period during which it is worn by a user. For example, the bracelet or gaming device may include a device which permits detection of whether the bracelet is in a looped position with its ends adhered to each other. This can be advantageous where it is desirable to determine, after a bracelet has been worn by a user, whether the bracelet has been removed by the user (because the ends of the bracelet are no longer in contact with each other). In some embodiments of the invention, a very low amperage current can be passed through the bracelet through a transmitter or battery in the bracelet. Thus, if the bracelet is worn by a user, the ends of the bracelet will be electrically connected and a closed circuit will be formed thereby causing current to flow through the circuit. Such a current can be detected by the gaming device. In other embodiments, the magnetic field of the circuit can be detected by the gaming device. If the circuit is broken or otherwise disengaged, indicating that the user has probably removed the bracelet, then the hard check can fail, and the user must pass the hard check in another manner (e.g., by obtaining another bracelet). The bracelet may or may not be permanently disabled upon removal.

In various embodiments, an indicator may be associate with the apparatus 920, or with any device containing the apparatus, such as a bracelet. For example, a bracelet may include an indicator. The indicator may be a light (e.g., a light-emitting diode), a buzzer or other noise maker, a vibrating device, or any other indicator. The indicator may broadcast or project a signal when some aspect of the apparatus 920 or the device containing the apparatus (e.g., the bracelet) is near failing. For example, in various embodiments, a current runs through the bracelet so as to allow a determination of whether the bracelet is broken. The current may be powered by a power source, such as by a battery. In various embodiments, an indicator on the bracelet may show when the power source is near expiration. In various embodiments, the device 910 may provide an indication of when one or more functions of the apparatus are near failure. For example, the bracelet may communicate a signal to the device 910 indicating that a power source within the bracelet is near expiration. The device 910 may then display a message to a player of the device which tells the player that he should get a new bracelet because the battery in his current bracelet is about to lose power.

The bracelet may have visual or other indicator or indicia associated with user characteristics. Accordingly, different users may be handed out bracelets having different colors, dimensions, sizes, styles, etc. based on their gaming, or other, traits. For example, upon verification of user identity and/or retrieval of user record, a user that wagers or trades in high volumes may be given a bracelet having a different color than that given to a user that wagers or trades in lower volumes.

In some embodiments, the gaming device may be configured to provide a recognizable visual, audio and/or other signal when access to the device is provided through the bracelet (i.e., when the hard check is successful) or merely when the device is within a certain distance from the bracelet. For example, an LED on the gaming device may be enabled when access is provided. As another example, the device may produce a blinking light, a beeping sound and/or may vibrate when the device is capable of detecting the bracelet and/or when the user actuates a locator button on the device. Actuation of such a button may also be part of a sequence of steps taken to unlock the device.

In some embodiments of the invention, the gaming device may be programmed to recognize one or more particular bracelets at the time the wireless gaming device is registered to be provided to a user. In such embodiments, the gaming device may be selected or determined to match or correspond to the unique identifier of the particular bracelet. For example, a unique identifier may be stored by, coded into, or programmed into the wireless gaming device.

In other embodiments of the invention, a unique identifier, and/or user characteristics, are coded into the bracelet at the time the wireless gaming device is registered to be provided to a user. In these embodiments, the identifier of the bracelet would be set to match, correspond to or otherwise be recognized by, the wireless gaming device.

In some embodiments of the invention, the identifiers associated with a hard check apparatus (e.g., a bracelet as discussed above) are stored on a server or other device that the wireless gaming device can access. In other embodiments, the wireless gaming device does not store such identifiers. Information conveyed from the apparatus to the wireless gaming device may be checked, compared to predetermined criteria or matched locally (i.e., at the wireless gaming device by, e.g., the device itself) or remotely through, e.g., a server which can authenticate users and communicate back with the device. For example, such information may be transmitted across network 16 of FIG. 1 and may be processed by computer 18.

In some embodiments of the invention, the identifier associated with a particular apparatus (e.g., bracelet) allows one or more accounts of the user to be recognized and accessed. For example, an account that stores or manages the "comp points" of the user may be determinable by, and accessible from, the wireless gaming device. Thus, the user may wager using the wireless gaming device and also have her comp points manipulated (e.g., added to in accordance with her use of the wireless gaming device). In various embodiments, an apparatus, such as a bracelet, may serve as a player tracking card. An apparatus 920 may be detectable not only by a wireless gaming device, but also by a stationary gaming device, such as by a slot machine. A stationary gaming device may detect the apparatus as a user interacts with the stationary gaming device. For example, as a user presses a button on a slot machine, the user's arm may come close to the slot machine. The slot machine may then detect a signal from the bracelet that the user is wearing on his arm. The slot machine may determine the user's identity based on the signal from the bracelet. The slot machine may accordingly cause a comp point account or other account associated with the user to be updated based on the user's play at the slot machine.

The wireless gaming device can be programmed to determine the form of hard check used (e.g., from a bracelet instead of from a comp card with a magnetic stripe). For example, the manner of input may provide such a determination (e.g., an identifier received via an integrated card reader as depicted in FIG. 10 indicates that the hard check is performed via a card, while an identifier received via an RFID transponder indicates that the hard check is performed via a bracelet as depicted in FIG. 11). Alternatively or additionally, the form of hard check may be coded into the identifier. For example, identifiers that begin with the number "1" may indicate that the hard check is via a card, while identifiers that begin with the number "2" indicate that the hard check is via a bracelet.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

In various embodiments, apparatus 920 may be a ring, necklace, earring, pendant, hairpin, or any other type of accessory or jewelry. In various embodiments, apparatus 920 may be an item used in body piercings. In various embodiments, apparatus 920 may be a belt, shoe, scarf, hat, or other item of clothing.

In various embodiments, apparatus 920, e.g., a bracelet, may emit a time varying signal. The time varying signal may vary according to a predetermined schedule. For example, for a first five-minute period, the bracelet may emit a signal comprising the bit sequence "1010101010". For a second five-minute period, the bracelet may emit a signal comprising the bit sequence "1111100000". For a third five-minute period, the bracelet may emit a signal comprising a third bit sequence. As the bit sequences may be predetermined, the device may anticipate certain sequences at certain times. The device may store a table or some other record of which sequences should be received from apparatus 920 at which times. When the device receives a signal from the apparatus at a particular time, the device may verify that the signal matches an anticipated signal for that period of time. If the signal does not match, the device may not allow the user to play.

In various embodiments, a time varying signal emitted from an apparatus may make it difficult for a malfeasant to intercept a signal from the apparatus and subsequently emit the same signal in order to pose as a different person. Further, a malfeasant may find it difficult to track a user because a signal emitted by the user's bracelet will vary.

In various embodiments, an apparatus, such as a bracelet, may store user information. User information may include medical information, such as the names and doses of drugs being taken by the user, the names of drugs to which the user is allergic, the user's blood type, one or more medical conditions relevant to the user, the name of the user's physician, the name of the user's emergency contact, or any other medical information, or any other information. In various embodiments, signals emitted from an apparatus may generally be encrypted. A user's device (e.g., mobile wireless device) may possess a key for decrypting signals from the user's own apparatus, but not necessarily for decrypting signals from other users' apparatuses. However, in various embodiments, signals from all users apparatus may be decrypted with a single "master key". Such master key may only be in the possession of medical professionals. Thus, a medical professional, upon finding an unconscious user, may be able to read information from the user's apparatus using a device in the possession of the medical professional, where such device is in possession of the master key. In various embodiments, medical information may be the only information encrypted in the signal of an apparatus. In various embodiments, the medical information may be encrypted using a different key than is used for encrypting other information. In this way, for example, mobile wireless devices may have access to basic information about a user, such as a user name or identifier, but not about a user's medical information. On the other hand, a medical professional may possess a device which does have the key to accessing medical information about a user.

In various embodiments, the apparatus 920 may be physically connectable to the device 910. For example, a conducting cable or wire may be plugged into both the bracelet and the device. In various embodiments, the player may only be allowed to use the device 910 while the connection is maintained.

In various embodiments, the apparatus 920 may interface with an access control system. A player may move apparatus 920 close to reader in order to identify himself to the reader. The reader may then unlock a door (e.g., temporarily unlock the door) so that the player may enter a restricted location. In various embodiments, the apparatus 920 may serve as a room key. The player may move the apparatus near to a reader on his hotel room. The reader on the hotel room door may be configured to unlock the door only upon reading certain signals which correspond to the player, or to other people staying in the room. The apparatus 920 may also allow the player to gain access to restricted lounges, to exclusive restaurants, or to other restricted or private areas.

In various embodiments, apparatus 920 may be used to make payments. The apparatus may emit a signal, for example, that represents a financial account identifier. The apparatus may emit a signal which can be tied to a financial account identifier. In various embodiments, the apparatus emits a signal which provides a merchant or other party with a room number of the user. A purchase made by the user can then be charged to the user's room. In various embodiments, the signal emitted by the apparatus 920 may represent a credit card number. A merchant which receives the signal can then charge the user's credit card for a purchase. In various embodiments, a casino may store a record which includes a signal (e.g., a bit pattern) that is emitted by a user's apparatus 920 in association with a financial account identifier (e.g., a debit card number) of the user. Thus, whenever the casino receives a signal from the user's apparatus 920 in the context of a payment or purchase, the casino may charge the payment or purchase to the associated financial account identifier.

In various embodiments, a device 910 may be configured to take a first set of actions upon detection of a signal from a first apparatus 920. In various embodiments, a device 910 may be configured to permit a first set of activities upon detection of a signal from a first apparatus 920. For example, as described herein, a device 910 may allow the play of games, may accept wagers, may determine payouts, and may take other actions and permit other activities associated with game play when detecting a signal from a first apparatus. In various embodiments, the same device 910 may be configured to take a second set of actions or permit a second set of activities upon the detection of a signal from a second, different apparatus 920 (i.e., the second apparatus is different from the first apparatus). For example, when the device 910 detects a signal emitted from the second apparatus, the device may display the name of the user with the second apparatus. However, the device may not allow the user with the second apparatus to make wagers using the device. Thus, in various embodiments, a device may respond to different apparatuses, but may respond in different ways. The same device may allow take different actions or permit different activities depending on which apparatus it detects.

In various embodiments, a user may be made aware of the proximity of friends or colleagues. A user may be playing on his device. If a friend of the user comes close enough that the device can detect the friend's apparatus, the device may display the name of the friend. The user may then look up to find his friend. A device may be configured to recognize one or more friends of a user. The device may be configured to recognize a particular signals and to match such signals with the names of the user's friends. For example, the device may store a lookup table in which names are stored in association with signal patterns.

In various embodiments, a device 910 need not directly detect an apparatus 920. In various embodiments, an apparatus 920 need not directly detect a device 910. In various embodiments, other methods may be used to determine whether the device 910 and the apparatus 920 are proximate to one another. For example, a detector in the ceiling may detect both the device and the apparatus. If the detector is capable of detecting only nearby devices and apparatuses, it may be inferred that the detected device and that the detected apparatus are near to one another. The detector may report that the two are near to one another to the casino, and the casino may transmit a signal to the device 910 indicating that the apparatus is near. Accordingly, the apparatus 910 may allow gaming activities to take place.

Below are described other methods by which one object/thing/device/apparatus may detect another.

Detection of One Device by Another

Various embodiments described herein may refer to the interaction between a first device and a "nearby" second device. In various embodiments, the first device may take action if the second device is nearby. In various embodiments, the second device may take action if the first device is nearby. When terms such as "nearby", "near", "close", "proximate", "presence", or the like are used, it will be understood that the first device may recognize the presence of the second device in various ways, that the second device may recognize the presence of the first device in various ways, that the first device may react to the presence of the second device in various ways, and that the second device may react to the first device in various ways. It may be noted that the first device may react to the presence of the second device without recognizing the presence of the second device if, for example, the first device is instructed to take an action by a third device which recognizes that the second device is near to the first device. In various embodiments, the first device and/or the second device may be in motion. For example, the first device may be moving (e.g., the first device may be carried by a walking person) while the second device may be stationary.

Various technologies may allow a first device to recognize and/or to react to the presence of a second device. Various technologies may allow a second device to recognize and/or to react to the presence of a first device. As used herein, the term "beacon" may refer to a device which generates a signal which may be used as a reference signal by another device or person, e.g., so that the other device may determine its own location or position. A beacon may emit a continuous, periodic, sporadic, or other type of signal. A beacon may emit a directed signal (e.g., a signal which is most easily detected by devices at a certain incident angle to the beacon) or the beacon may emit a signal of equal strength in all directions. A beacon may emit a signal when triggered by the presence of another device, or may emit a signal independently of other events. A beacon may have, as its sole function, the broadcast of a reference signal. A beacon may serve as a beacon only incidentally. For example, a light bulb may incidentally serve as a beacon even though its primary purpose may be to light a room. A beacon may be natural (e.g., the sun) or man-made. A beacon may emit light, sound, radio waves, microwaves, odors, or any other form of signals.

- Radio Frequency Identification (RFID) tags or transponders are devices, generally small, that can transmit signals and/or redirect signals, and use such signals as a means for providing identification. The transmitted or redirected signals are generally radio waves. Signals which are transmitted or redirected may contain a unique signature or pattern, which may serve to uniquely identify the RFID tag. If the tag is associated with a device (e.g., by attachment or by incorporation into the device), then the unique identification of the tag can, by association, serve to uniquely identify the device.
- Near field communication (NFC) is a technology that allows for secure wireless communication over short distances, typically in the range of inches. An exemplary application has been tested by Motorola and Mastercard, in which cellular phones are outfitted with NFC to allow for credit card payments using cellular phones.
- Bluetooth is a specification for wireless networks which provides a means for devices to use radio waves to communicate over short distances.
- WiFi is a technology, based on radio waves, for operating wireless local area networks. WiFi can allow a device to access the Internet via hotspots. WiFi can also allow two devices to communicate with one another directly in peer-to-peer mode.

Infrared data transmission can be used as a means of communication between two nearby devices. For example, an infrared light-emitting diode (LED) can be used to generate signals. The signal pattern can be created by switching the LED on and off. A receiver may include a silicon photodiode, which may convert incident infrared light into electrical signals. Infrared signals may also be transmitted with lasers.

A device may be recognized by means of a captured picture or image of the device. For example, a first device may take a picture of a second device. The first device may use image processing algorithms to detect salient features of the second device. For example, if the second device has a pattern of black and white stripes, then the first device may search for such a pattern within captured images.

One or more devices may use positioning technologies to determine their own location. Once the locations of two devices are known, simple algorithms may be used to determine whether the devices are close to one another or not. For example, the distances between two devices with known x and y coordinates can be at least approximated using the Pythagorean Theorem. Various positioning technologies may be used. For example, a device may receive a signal from a beacon or other signal generator of a known location. Particularly if the beacon has a short range, the device's position may be assumed to approximate the position of the beacon. In various embodiments, a device may receive signals from multiple beacons or signal generators. The signal generators may coordinate to transmit the signals simultaneously. However, depending on the device's location, the device will not necessarily receive the signals from all the beacons at the same time. For example, if the device is closer to beacon 1 than to beacon 2, the device will receive the signal from beacon 1 prior to receiving the signal from beacon 2. Based on the arrival times of signals from the various beacons, the device's location may be deduced. For example, geometric or trigonometric algorithms may be used to determine the location of the device based on the known locations of the beacons and based on the arrival times of simultaneously transmitted signals from the beacons. In an analogous fashion to systems involving beacons, positioning systems may make use of receivers at known locations (e.g., fixed receivers). The fixed receivers each receive a signal from the device about which a location is desired. The same signal from the device might arrive at the different receivers at different times, or from different angles. Based on the arrival times or angles of arrival of the signal at the various receivers, algorithms may be used to determine the location of the device. Exemplary positioning systems are as follows:

- The Global Positioning System (GPS) is based on a constellation of satellites which transmit reference signals to locations on earth. GPS receivers can pick up reference signals from multiple satellites and use the signals to determine a position and/or an altitude.
- Long Range Navigation (LORAN) is a navigation based on earth-based radio transmitters. The location of a device can be estimated based on differences in arrival times at the device of signals from three or more transmitters.

Radiolocation using the cellular telephone network is a system whereby cellular base stations serve as fixed receivers. The signal from a cellular phone may be received at multiple base stations. The location of the cellular phone may be determined based on when a signal from the cellular phone was received at each of the base stations, based on the angle with which a signal from the cell phone was received at each of the base stations, and/or based on characteristic distortions in the cell phone signal that would indicate a particular location of origin of the signal.

A first device may emit an audio signal. The audio signal may consist of a distinct series of notes or pulses. A second device may pick up the audio signal using a microphone, for example. The second device may recognize the distinctive pattern of the audio signal and may thereby deduce the presence of the first device. In a similar fashion, the second device may emit an audio signal which may allow the first device to identify the second device.

A first device may recognize the presence of a second device from physical or electronic contact. For example, a first device may have a port where a second device can be docked. When docked, the second device may come into electrical contact with the first device. The first device may thereby recognize the presence of the second device and/or the second device may thereby recognize the presence of the first device.

There are various ways in which one or more devices may detect the presence of one or more other devices. There are various ways in the proximity of two devices may be determined.

A first device may detect a signal from a second device. The first device may thereby detect the presence of the second device.

A first device may determine its own location. For example, the first device may use a positioning system to determine its own location. The first device may already know the location of the second device. For example, the second device may be at a well-known, fixed location. The first device may have stored in memory the location of the second device. Once the first device knows its own location and that of the second device, the first device may deduce (e.g., using geometric algorithms) when the first device is near to the second device.

A third device may detect the position of a first device, e.g., using a positioning system. The third device may know the position of a second device. The third device can then inform the first, second, or both devices of the positions of either or both of the first and second devices. The first device may thereby determine whether it is proximate to the second device. The second device may thereby determine whether it is proximate to the first device. In some embodiments, the third device may inform the first device that the first device is near the second device. In some embodiments, the third device may inform the second device that it is near the first device. In some embodiments, the third device may instruct the first device to take some action based on the fact that the first device is near to the second device, without necessarily informing the first device that the first device is near the second device. In some embodiments, the third device may instruct the second device to take some action based on the fact that the second device is near to the first device, without necessarily informing the second device that the second device is near the first device.

A third device may detect the positions of both a first device and a second device. The third device can then inform the first, second, or both devices as above. That is, the third device may inform the first and/or second devices of the first and/or second devices' positions or of the fact that the first and second devices are near to each other. The third device may also provide instructions to the first and/or to the second device based on the fact that the two devices are near to each other.

A third device may detect the position of a first device. A fourth device may detect the position of a second device. The third and fourth devices may then inform the first device of both positions. The third and fourth devices may inform the second device of both positions. The third and fourth devices may inform the first device that the first device is near the second device. The third and fourth devices may inform the second device that the first device is near the second device. The third and/or fourth devices may instruct the first device to take some action based on the fact that the first device is near the second device. The third and/or fourth devices may instruct the second device to take some action based on the fact that the first device is near the second device. The fourth device may inform the third device of the position of the second device. The third device may inform the first device of the positions of the first device and the second device. The third device may inform the first device that the first device is near the second device. The third device may inform the first device to take some action based on the fact that the first device is near the second device. The third device may inform the second device of the positions of the first device and the second device. The third device may inform the second device that the first device is near the second device. The third device may inform the second device to take some action based on the fact that the first device is near the second device.

A third device may detect the position of a first device. A fourth device may detect the position of a second device. The third and fourth devices may inform a fifth device of both positions. The fifth device may inform the first and/or second devices of both positions. The fifth device may inform the first device that it is near to the second device. The fifth device may inform the second device that it is near to the first device. The fifth device may instruct the first device to take some action based on the fact that the first device is near the second device. The fifth device may instruct the second device to take some action based on the fact that the second device is near the first device.

Detection of a Human by a Device

A mobile gaming device may detect the presence of another human being in various ways. The mobile gaming device may include a microphone. The microphone may pick up ambient audio signals. The mobile gaming device may analyze ambient audio signals for tell-tell human sounds, such as the sound of a voice, the sound of breathing, the sound of steps, and so on. For example, the mobile gaming device may use special software which is tuned to recognize voice signals. The mobile gaming device may recognize the presence of humans by other means. For example, the mobile gaming device may include a heat or infrared sensor. The mobile gaming device may use such a sensor to pick up the heat signatures of humans. In various embodiments, the mobile gaming device may include a camera. The camera may periodically snap pictures of its surroundings. The mobile gaming device may include image processing software for analyzing the pictures. The image processing software may have the capability to recognize images associated with humans. In various embodiments, the mobile gaming device may recognize the presence of humans via devices associated with the humans. For example, the mobile gaming device may recognize the signal from a nearby cell phone, e.g., by receiving the signal at an antenna associated with the mobile gaming device. Presumably, the cell phone is being carried by a human. Thus, by recognizing the presence of a cell phone, the mobile gaming device may be indirectly recognizing the presence of a human. In various embodiments, the mobile gaming device may recognize the presence of another mobile gaming device. Presumably, the other mobile gaming device is being held or carried by another human. Thus, by recognizing another mobile gaming device, the first mobile gaming device may indirectly recognize the presence of another human.

In various embodiments, when an apparatus is said to emit a signal, the apparatus may actively generate and emit the signal (e.g., using its own power source) or may create a signal by passively reflecting an incident signal from another source.

The following are embodiments, not claims:

A. A method comprising:
  receiving a first signal at a first time;
  determining a first period based on the first time;
  comparing the first signal to a second signal that is associated with the first period;
  permitting the placement of a first bet and the generation of a first game outcome if the first signal matches the second signal;
  receiving a third signal at a second time, in which the third signal is different from the first signal;
  determining a second period based on the second time;
  comparing the third signal to a fourth signal that is associated with the second period;
  permitting the placement of a second bet and the generation of a second game outcome if the third signal matches the fourth signal.

For example, a gaming device may recognize a particular signal identifying a player as legitimate at a first time, but as illegitimate at a second time. At the second time, the gaming device recognizes a different signal as legitimate. The gaming device may permit play only when receiving a legitimate signal.

B. The method of embodiment A in which the first signal is received from a bracelet comprising a wristband and an RFID tag.

C. The method of embodiment B in which the third signal is received from the bracelet.

Thus, an apparatus may be configured to generate a first signal during a first time period and a third signal during a second time period. Signals may be generated according to a predetermined schedule.

D. The method of embodiment A in which the second signal is stored in a table in association with the first period, and the fourth signal is stored in the table in association with the second period. For example, the table may contain a schedule of which signals are legitimate at each period of time.

E. The method of embodiment D in which the second signal is stored in the table in further association with a player identifier, and in which the fourth signal is stored in the table in further association with the player identifier. For example, a gaming device may recognize a player according to a signal received. The gaming device may be programmed to allow only that player to play games on the gaming device.

F. The method of embodiment A in which the first period is a period of time within which the first time falls. For example, the first period of time may comprise a time interval from 9:00:00 to 9:04:59, and the first time may be 9:02:32.

G. The method of embodiment A in which the first period is adjacent in time to the second period. For example, the first period may be from 9:00:00 to 9:04:59 and the second period may be from 9:05:00 to 9:09:59.

H. An apparatus comprising:
  a wristband;
  an emitter operable to emit different signals according to a programmed schedule, wherein each signal is associated with the same player.

I. The method of embodiment H in which the emitter is operable to repeatedly emit a first signal during a first five-minute period, and to repeatedly emit a second signal during a second five-minute period.

J. An apparatus comprising:
  a wristband;
  an emitter operable to emit a first signal which is associated with a first player;
  a receiver operable to detect a second signal which is associated with a second player;
  a medium for storing a set of signals, each signal associated with a player;
  logic operable to use the medium to look up the identity of the second player based on the second signal; and
  an output device operable to produce a third signal which is perceptible to humans, the third signal produced based on the identity of the second player.

For example, a bracelet may receive signals emitted by the bracelets of other players. The bracelet may recognize some signals received from other bracelets as signals associated with friends of the person wearing the bracelet.

K. The apparatus of embodiment J in which the output device is a display device. For example, the output device may be an liquid crystal display screen attached to the bracelet.

L. The apparatus of embodiment J in which the output device is a buzzer.

M. The apparatus of embodiment J in which the output device is operable to produce the third signal if the identity of the second player corresponds to a friend of the first player. For example, the output device may display the name of the second player's friend.

The following sections I-X provide a guide to interpreting the present application.

I. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

II. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

III. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

What is claimed is:

1. A method comprising:

receiving a bit sequence at a first time;

determining from a database a first bit sequence, wherein the database stores a plurality of time periods, including a first time period and a second time period, and further stores a plurality of bit sequences, including a first bit sequence and a second bit sequence, wherein the database associates the time periods with respective bit sequences, the first time period having the first bit sequence associated therewith and the second time period having the second bit sequence associated therewith, wherein the database further stores a user identifier, and associates the first and second bit sequences with the identifier, and wherein determining the first bit sequence comprises determining that the first time falls within the first time period, and determining from the database that the first bit sequence is associated with the first time period;

comparing the bit sequence to the first bit sequence;

permitting an activity if the bit sequence matches the first bit sequence;

receiving another bit sequence at a second time;

determining from the database the second bit sequence, wherein determining the second bit sequence comprises determining that the second time falls within the second time period, and determining from the database that the second bit sequence is associated with the second time period;

comparing the another bit sequence to the second bit sequence; and permitting an activity if the another bit sequence matches the second bit sequence.

2. The method of claim 1, in which the bit sequence is received from a bracelet comprising a wristband and an RFID tag.

3. The method of claim 2, in which the another bit sequence is received from the bracelet.

4. The method of claim 1, in which the first time period is adjacent in time to the second time period.

5. The method of claim 1, in which the activity and the another activity include the placing of bets.

6. A method comprising:

detecting by a receiver a first signal produced by a wristband associated with a first person;

detecting by the receiver a second signal produced by a wristband associated with a second person;

using a medium, which stores a set of signals each associated with a person, to look up an identity of the second person based on the second signal; and causing an output device to produce a third signal which is perceptible to humans, the third signal produced based on the identity of the second person.

7. The method of claim 6, in which detecting the first signal comprises detecting different signals according to a programmed schedule, wherein each signal is associated with the first person.

8. The method of claim 7, in which an emitter emits the different signals and repeatedly emits a signal during a first five-minute period, and repeatedly emits a different signal during a second five-minute period.

9. The method of claim 6, in which the output device is a display device.

10. The method of claim 6, in which the output device is a buzzer.

11. The method of claim 6, in which the output device produces the third signal if the identity of the second person corresponds to a friend of the first person.

12. An apparatus comprising:

at least one processor;

a memory having instructions stored thereon that when executed by the at least one processor direct the at least one processor to:

receive a bit sequence at a first time;

determine from a database a first bit sequence,
    wherein the database stores a plurality of time periods, including a first time period and a second time period, and further stores a plurality of bit sequences, including a first bit sequence and a second bit sequence,
    wherein the database associates the time periods with respective bit sequences, the first time period having the first bit sequence associated therewith and the second time period having the second bit sequence associated therewith,
    wherein the database further stores a user identifier, and associates the first and second bit sequences with the identifier, and
    wherein determining the first bit sequence comprises determining that the first time falls within the first time period, and determining from the database that the first bit sequence is associated with the first time period;

compare the bit sequence to the first bit sequence;

permit an activity if the bit sequence matches the first bit sequence;

receive another bit sequence at a second time;

determine from the database the second bit sequence, wherein determining the second bit sequence comprises determining that the second time falls within the second time period, and determining from the database that the second bit sequence is associated with the second time period;

compare the another bit sequence to the second bit sequence; and permit an activity if the another bit sequence matches the second bit sequence.

* * * * *